US010331099B2

(12) United States Patent
Adler et al.

(10) Patent No.: US 10,331,099 B2
(45) Date of Patent: *Jun. 25, 2019

(54) CONTROLLER AND USER INTERFACE DEVICE, SYSTEMS, AND METHODS

(71) Applicant: LightLab Imaging, Inc., Westford, MA (US)

(72) Inventors: Desmond Christopher Adler, Concord, MA (US); Joshua M. Gomes, Somerville, MA (US); David Winston, Winchester, MA (US); Susan Moynihan, Andover, MA (US)

(73) Assignee: LIGHTLAB IMAGING, INC., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,317

(22) Filed: May 25, 2018

(65) Prior Publication Data
US 2018/0275622 A1  Sep. 27, 2018

Related U.S. Application Data

(63) Continuation of application No. 14/722,753, filed on May 27, 2015, now Pat. No. 9,989,945, which is a
(Continued)

(51) Int. Cl.
G05B 15/02 (2006.01)
G06F 3/038 (2013.01)
(Continued)

(52) U.S. Cl.
CPC ............... G05B 15/02 (2013.01); G05G 1/10 (2013.01); G05G 9/047 (2013.01); G06F 3/038 (2013.01);
(Continued)

(58) Field of Classification Search
CPC .......... G06F 3/016; G06F 3/011; G06F 3/038; G05B 15/02
See application file for complete search history.

(56) References Cited

U.S. PATENT DOCUMENTS 5,321,501 A   6/1994 Swanson et al.
5,432,530 A   6/1995 Arita et al.
(Continued)

FOREIGN PATENT DOCUMENTS

EP    2463874       6/2012
JP    2002-301065   10/2002
(Continued)

OTHER PUBLICATIONS

"2012 Medis Specials", Retrieved Dec. 4, 2013 from Internet: URL:http//www.medisspecials.com/assets/QAngioOCT_RE_Leaflet.pdf (Jan. 1, 2012).
(Continued)

Primary Examiner — Alexander Eisen
Assistant Examiner — Mansour Said
(74) Attorney, Agent, or Firm — K&L Gates LLP

(57) ABSTRACT

A data collection system controller that includes a housing such as a cover. The housing includes a user facing section and a support facing section defining a hole. The controller also includes a first input device adjacent the user facing section and a second input device. The second input device includes a knob comprising a third input device and a rotatable shaft extending through the hole and partially disposed within the knob. In one embodiment, the second input device is an XYZ joystick with a button. In one embodiment, the joystick and the first input device are angled relative to each other on either side of an elbow joint.

(Continued)

In part, the invention relates to a method of controlling the display of image data obtained with respect to a blood vessel.

18 Claims, 26 Drawing Sheets

Related U.S. Application Data continuation of application No. 13/798,017, filed on Mar. 12, 2013, now Pat. No. 9,069,396.

(51) Int. Cl.

| | | |
|---|---|---|
| *G05G 9/047* | (2006.01) | |
| *G06F 3/048* | (2013.01) | |
| *G06F 3/0489* | (2013.01) | |
| *G06F 3/0354* | (2013.01) | |
| *G06F 3/0338* | (2013.01) | |
| *G06F 3/0346* | (2013.01) | |
| *G05G 1/10* | (2006.01) | |
| *G06F 3/0484* | (2013.01) | |

(52) U.S. Cl.
CPC .......... *G06F 3/0338* (2013.01); *G06F 3/0346* (2013.01); *G06F 3/03543* (2013.01); *G06F 3/048* (2013.01); *G06F 3/04842* (2013.01); *G06F 3/04845* (2013.01); *G06F 3/04847* (2013.01); *G06F 3/04892* (2013.01)

(56) References Cited

U.S. PATENT DOCUMENTS

| | | | |
|---|---|---|---|
| 5,459,570 A | 10/1995 | Swanson et al. | |
| 5,465,147 A | 11/1995 | Swanson | |
| 5,509,093 A | 4/1996 | Miller et al. | |
| 5,619,368 A | 4/1997 | Swanson | |
| 5,748,598 A | 5/1998 | Swanson et al. | |
| 5,784,352 A | 7/1998 | Swanson et al. | |
| 5,956,355 A | 9/1999 | Swanson et al. | |
| 6,111,645 A | 8/2000 | Tearney et al. | |
| 6,134,003 A | 10/2000 | Tearney et al. | |
| 6,160,826 A | 12/2000 | Swanson et al. | |
| 6,191,862 B1 | 2/2001 | Swanson et al. | |
| 6,282,011 B1 | 8/2001 | Tearney et al. | |
| 6,421,164 B2 | 7/2002 | Tearney et al. | |
| 6,445,939 B1 | 9/2002 | Swanson et al. | |
| 6,471,648 B1 | 10/2002 | Gamelsky et al. | |
| 6,485,413 B1 | 11/2002 | Boppart et al. | |
| 6,501,551 B1 | 12/2002 | Tearney et al. | |
| 6,552,796 B2 | 4/2003 | Magnin et al. | |
| 6,564,087 B1 | 5/2003 | Pitris et al. | |
| 6,570,659 B2 | 5/2003 | Schmitt | |
| 6,706,004 B2 | 3/2004 | Tearney et al. | |
| 6,879,851 B2 | 4/2005 | McNamara et al. | |
| 6,891,984 B2 | 5/2005 | Petersen et al. | |
| 6,903,652 B2 | 6/2005 | Noguchi et al. | |
| 6,920,041 B2 * | 7/2005 | Oross ...................... | G05G 9/02 345/161 |
| 7,208,333 B2 | 4/2007 | Flanders et al. | |
| 7,231,243 B2 | 6/2007 | Tearney et al. | |
| 7,241,286 B2 | 7/2007 | Atlas | |
| 7,414,779 B2 | 8/2008 | Huber et al. | |
| 7,415,049 B2 | 8/2008 | Flanders et al. | |
| RE40,608 E | 12/2008 | Glover et al. | |
| 7,625,366 B2 | 12/2009 | Atlas | |
| 7,813,609 B2 | 10/2010 | Petersen et al. | |
| 7,848,791 B2 | 12/2010 | Schmitt et al. | |
| 7,916,387 B2 | 3/2011 | Schmitt et al. | |
| 7,935,060 B2 | 5/2011 | Schmitt et al. | |
| 8,116,605 B2 | 2/2012 | Petersen et al. | |
| 8,206,377 B2 | 6/2012 | Petroff | |
| 8,325,419 B2 | 12/2012 | Schmitt | |
| 8,358,461 B2 | 1/2013 | Huber et al. | |
| 8,412,312 B2 | 4/2013 | Judell et al. | |
| 8,449,468 B2 | 5/2013 | Petersen et al. | |
| 8,478,387 B2 | 7/2013 | Xu | |
| 8,503,844 B2 | 8/2013 | Petersen et al. | |
| 8,581,643 B1 | 11/2013 | Schmitt | |
| 8,582,109 B1 | 11/2013 | Schmitt | |
| 8,582,619 B2 | 11/2013 | Adler | |
| 8,582,934 B2 | 11/2013 | Adler et al. | |
| 9,069,396 B2 * | 6/2015 | Adler ...................... | G06F 3/038 |
| 9,989,945 B2 * | 6/2018 | Adler ...................... | G06F 3/038 |
| 2002/0161351 A1 | 10/2002 | Samson et al. | |
| 2004/0130529 A1 * | 7/2004 | Magara ................... | A61B 6/00 345/161 |
| 2005/0201662 A1 | 9/2005 | Petersen et al. | |
| 2006/0095065 A1 | 5/2006 | Tanimura et al. | |
| 2009/0174931 A1 | 7/2009 | Huber et al. | |
| 2009/0306520 A1 | 12/2009 | Schmitt et al. | |
| 2010/0010305 A1 | 1/2010 | Kawano | |
| 2010/0076320 A1 | 3/2010 | Petersen et al. | |
| 2010/0094124 A1 | 4/2010 | Schoonenberg et al. | |
| 2011/0071404 A1 | 3/2011 | Schmitt et al. | |
| 2011/0101207 A1 | 5/2011 | Schmitt | |
| 2011/0157686 A1 | 6/2011 | Huber et al. | |
| 2011/0190586 A1 | 8/2011 | Kemp | |
| 2011/0228280 A1 | 9/2011 | Schmitt et al. | |
| 2012/0148335 A1 | 6/2012 | Nourry et al. | |
| 2012/0310081 A1 | 6/2012 | Adler et al. | |
| 2012/0238869 A1 | 9/2012 | Schmitt et al. | |
| 2012/0250028 A1 | 10/2012 | Schmitt et al. | |
| 2013/0010303 A1 | 1/2013 | Petersen et al. | |
| 2013/0012811 A1 | 1/2013 | Schmitt et al. | |
| 2013/0023761 A1 | 1/2013 | Petroff | |
| 2013/0030295 A1 | 1/2013 | Huennekens et al. | |
| 2013/0051728 A1 | 2/2013 | Petroff | |
| 2013/0072805 A1 | 3/2013 | Schmitt et al. | |
| 2013/0310698 A1 | 11/2013 | Judell et al. | |
| 2014/0039305 A1 * | 2/2014 | Wenderow ............... | A61B 6/12 600/424 |

FOREIGN PATENT DOCUMENTS

| | | |
|---|---|---|
| JP | 2008-543511 | 12/2008 |
| JP | 2010-526556 | 8/2010 |
| JP | 2013-505782 | 2/2013 |
| WO | 92/21084 | 11/1992 |

OTHER PUBLICATIONS

Karanasos et al., "Optical Coherence Tomography: Potential Clinical Applications", Current Cardiovascular Imaging Reports 5:4, pp. 206-220 (2012).

International Search Report and Written Opinion for International Application No. PCT/US2013/030622 mailed from International Searching Authority dated Jan. 2, 2014 (20 pgs.).

* cited by examiner

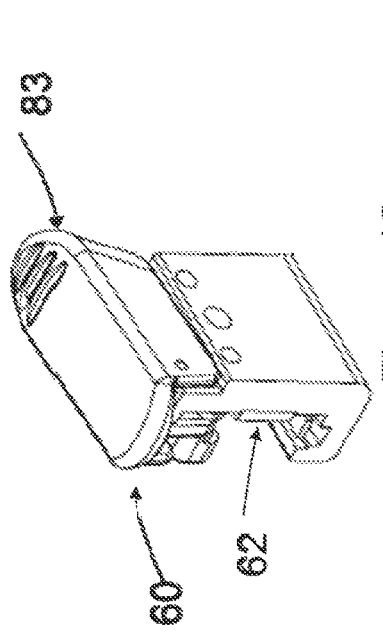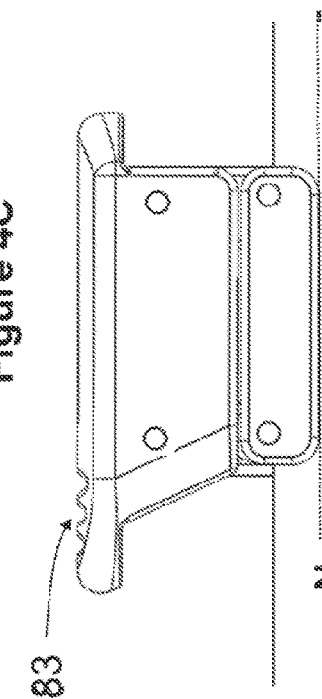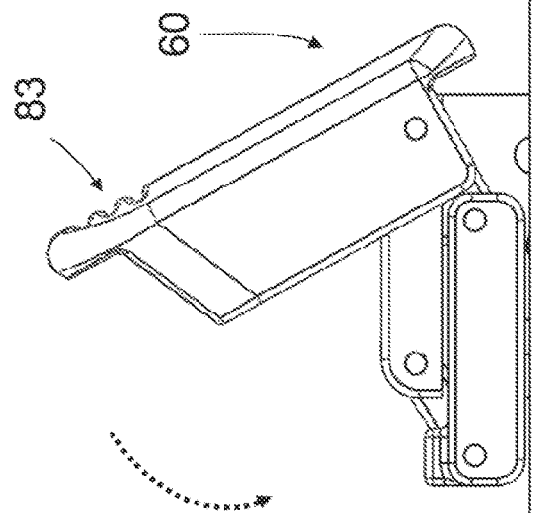

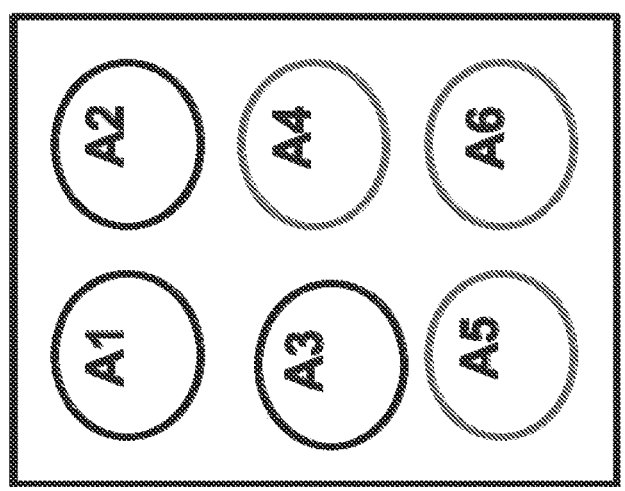

CONTROLLER AND USER INTERFACE DEVICE, SYSTEMS, AND METHODS

CROSS REFERENCE TO PRIOR APPLICATIONS

This application is a continuation of U.S. patent application Ser. No. 14/722,753, filed on May 27, 2015, which claims priority from U.S. patent application Ser. No. 13/798,017, filed on Mar. 12, 2013, now U.S. Pat. No. 9,069,396, the disclosures of which are incorporated by reference herein in their entirety.

BACKGROUND

Ultrasound-based imaging systems, such as intravascular ultrasound (IVUS) imaging systems use various control devices. For example, some IVUS systems use a pointing device as a control device. Such pointing devices can include trackballs, touch pads, touch sensitive monitors, mice, and two dimensional or XY joysticks. Since these devices are used in the context of a catheter-based procedure, they generally must be used in a sterile environment such as beneath a sterile drape. These devices have various limitations, some of which are outlined below.

Examples of some of the device specific limitations are outlined herein. Touch-sensitive monitors both display information and receive control inputs. As a result, they fail to serve as a discrete control device. With a touch monitor, a user must reach across the work surface to control the system. Trackball controllers, touch pads, touch monitors, and mice are difficult to use under a sterile drape. In addition a trackball lacks certain mouse functions. Touch-based devices such as touch pads are prone to accidental actuation. Mice are prone to fall off of a work surface. A two dimensional or XY joystick is challenging to use for "click and drag" functions for which a mouse is preferred. These limitations and others interfere with and add complexity when controlling a data collection system during or after a procedure such as an OCT, FFR, or IVUS procedure.

In addition, these various devices are often presented to a user in an orientation prone to cause carpal tunnel or other types of discomfort from use during or after a procedure. Accordingly, a need therefore exists for controllers that address these deficiencies. The present invention addresses these needs and others.

SUMMARY OF INVENTION

In part, the invention relates to controller embodiments for a data collection system such as a system that uses catheter-based imaging probes. The controller can include two or more sections that are each configured to support or permit access to one or more input devices such as joystick or other pointing device in one section and a button or a plurality of buttons in another section. The sections can be tilted relative to each other to orient the input devices such that they are tilted towards a user in one direction or away from a user in another direction. The controller is configured to securely attach to and release from a support such as table, bed, or other support in one embodiment. In one embodiment, one section of the controller is oriented relative to such a support at a tilt angle that ranges from about 90 degrees to about 170 degrees.

In one embodiment, one section of a controller housing includes a hole through which a shaft for a joystick passes. The joystick includes a knob configured to rotate with the shaft. In this way, the knob can be twisted in a clockwise or counterclockwise direction. The knob can also define a hole through which a switch or button is accessible for actuation. In one embodiment, the switch or button is programmable such that it can be used in lieu of a right or left mouse button when interacting with a graphical user interface. In one embodiment, the graphic user interface is configured to display optical coherence tomography data associated with a cross-section of a blood vessel which can be navigated in two or three dimensions using the controller.

The controller can include one or more ergonomic zones defined by a reference point such as an attachment region to a support or a plane parallel to or contacting the support. In one embodiment, the attachment region is part of or adjacent to a clamp. Each ergonomic zone can include one or more input devices. Each input device is actuatable in a sterile environment such as within a sterile drape. The controller can include one or more curved surfaces and have a three-dimensional geometric shape, edge, or a cross-sectional profile that includes one or more of the following shapes or features: elbow, hook, smooth joint, shoulder, bend, taper, rounded, elongate section, and others.

The controller includes a wired or wireless connector configured to transmit control signals to a computing device that has access to collected data from a procedure. The procedure is performed using a data collection probe such as an OCT, FFR, or IVUS probe in one embodiment.

In one embodiment, one section of the controller includes one or more buttons or switches. The buttons or switches can be arranged in a pattern such as rows or columns. In one embodiment, one of the two sections of the controller includes six programmable buttons or switches arranged in two columns with three rows each.

In one embodiment, the controller and user interface are configured for foot-free operation. Thus, in one embodiment, the range of menus, controls, and commands used to control a data collection system are interacted with using the input devices of the controller without using or needing a foot pedal or other controller.

In part, the invention relates to a data collection system controller, The controller includes a housing comprising a user facing section and a support facing section defining a hole; a first input device adjacent the user facing section; a second input device comprising a knob comprising a third input device, a rotatable shaft extending through the hole and partially disposed within the knob; and an attachment device configured to engage a support, the user facing section and the support facing section disposed at an angle relative to each other.

In one embodiment, the angle ranges from about 70 degrees to about 170 degrees. In one embodiment, the second input device is forward tilt biased. In one embodiment, the first input devices include a plurality of buttons. In one embodiment, the plurality of buttons are programmed to generate a command for a graphic user interface. In one embodiment, the command is selected from the group consisting of toggle display between off, 3D, angiography, and flythrough; toggle display between off and lumen profile; snap distal reference frame to current active frame; toggle segmentation between off, lumen, stent, and lumen and stent; and toggle active measurement between off, length, multipoint area, 2-point area, % AS, % DS, and text. In one embodiment, the controller further includes a wireless transmitter and a processor. In one embodiment, rotation of the shaft is programmed to generate a command for a graphic user interface. In one embodiment, the command is selected from the group consisting of move active frame to next proximal frame, move active frame to next distal frame, and engage rotation mode, rotate cut plane. In one embodiment, the angle ranges from greater than about 90 degrees to about 160 degrees.

In part, the invention relates to a data collection system. The system includes a graphical user interface; a processor in communication with the graphical user interface and configured to send commands to the graphical user interface, the graphical user interface configured to display image data from an optical coherence tomography procedure in a first panel in a two dimensional format, the graphical user interface configured to display image data from an optical coherence tomography procedure in a second panel in a three dimensional format, the graphical user interface configured to display image data from an angiography procedure in a third panel, and a receiver configured to receive commands from a controller, the graphical user interface configured to change one or more images frames in the first panel and second panel in response to a received command.

In one embodiment, the received command is generated from a rotatable input device. In one embodiment, the image frame in the first panel is synchronized with the image frame in the second panel. In one embodiment, the first panel displays cross-sectional images of a vessel and the second panel displays longitudinal images of a vessel. In one embodiment, the controller is a pointing device comprising a joystick having a forward tilt bias. In one embodiment, the controller comprises a housing comprising a user facing section and a support facing section defining a hole; a first input device adjacent the user facing section; a second input device comprising a knob comprising a third input device, a rotatable shaft extending through the hole and partially disposed within the knob; and an attachment device configured to engage a support, the user facing section and the support facing section disposed at an angle relative to each other.

In one embodiment, the controller comprises an attachment device configured to engage a support, a user facing section, and a support facing section, wherein the support facing section is disposed at an angle relative to the user facing section. In one embodiment, the angle ranges from about 70 degrees to about 170 degrees.

In part, the invention relates to a data collection system controller comprising an attachment device configured to engage a support; a user facing section comprising one or more input devices; and a support facing section comprising a joystick comprising a rotatable knob, wherein the user facing section and the support facing section disposed at an angle relative to each other such that the joystick has a forward tilt bias toward the support. In one embodiment, the angle ranges from about 70 degrees to about 170 degrees.

BRIEF DESCRIPTION OF DRAWINGS

The figures are not necessarily to scale, emphasis instead generally being placed upon illustrative principles. The figures are to be considered illustrative in all aspects and are not intended to limit the invention, the scope of which is defined only by the claims.

FIGS. 4A-4D are various perspective views of an attachment device of a controller in accordance with an illustrative embodiment of the invention.

FIG. 7C is a schematic diagram of an input device that includes a plurality of buttons or switches in accordance with an illustrative embodiment of the invention

DETAILED DESCRIPTION

Figure 1A:
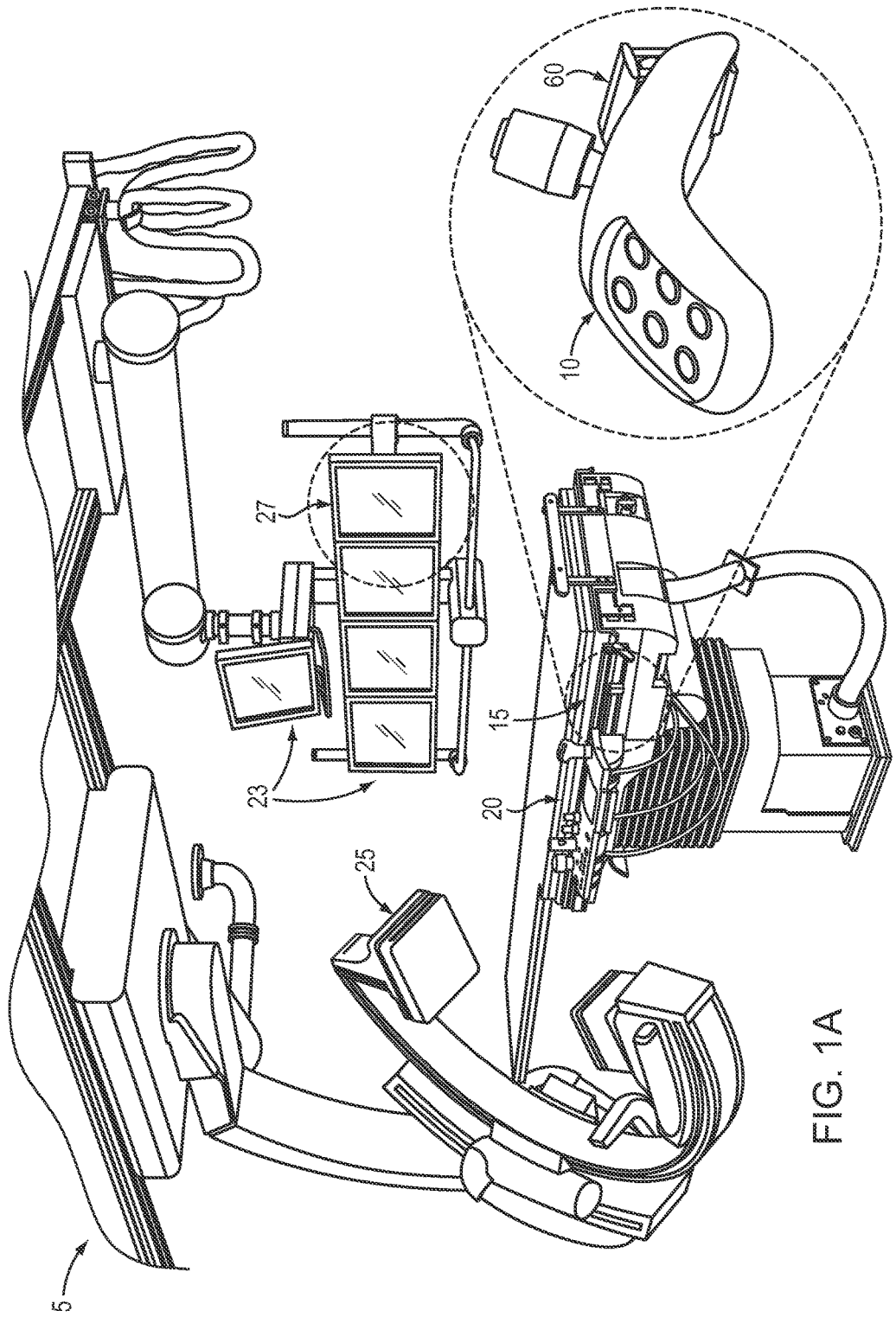
FIG. 1A shows a room layout of an exemplary procedure room such as a catheter lab and a controller in accordance with an illustrative embodiment of the invention.

In part, one embodiment of the invention relates to a controller and user interface software suitable for use with a data collection system such as an intravascular ultrasound system, an optical coherence tomography (OCT), a fractional flow reserve (FFR) system, angiography systems, combination systems such as a dual OCT and IVUS system or other suitable systems. These controllers and user interface software can be used in, near, or remote from a catheter lab, but are configured to integrate with or control the display of data obtained during a data collection procedure such as catheter-based procedure. One such procedure is an optical coherence tomography pullback. An exemplary catheter lab 5 is shown in FIG. 1A. Data is collected in such a lab 5 in some embodiments using a probe inserted in a patient disposed on a table or other support 20.

As shown in FIG. 1A, a controller 10 suitable for controlling a data collection system such as an OCT, FFR, IVUS, angiography, or other system is depicted. A user can interact with the data collection system or otherwise access and display stored image data through the mountable controller 10. The controller can be mounted to a support member 15 such as an accessory rail on a table, bed or other support 20. The support member 15 can be part of the support 20 or the controller can attach directly to the support 20 in one embodiment. In one embodiment, the controller 10 includes an attachment device 60 such as a clamp for mounting as shown. The controller 10 can be used to display and navigate a graphical user interface displayed on one or more monitors 23. In one embodiment, the monitors can be mounted on a ceiling suspension. A graphical user interface 27 can be displayed on a given monitor.

In one embodiment, the controller has a feature set configured to map to commands and menus available to a user as part of the graphic user interface 27. An angiography system 25 can be positioned relative to the support 20 to obtain x-rays of the patient while another data collection procedure such as an OCT procedure is underway. The graphic user interface 27 can display such OCT, angiography, FFR, IVUS, and other data of interest to a user. The controller 10 is configured to control the interface 27 and navigate the menus and image display features it presents to a user.

In part, one embodiment of the invention relates to a controller configured for use with a graphical user interface configured to represent and navigate data obtained during an OCT, FFR, IVUS, angiography, or other cardiovascular or lumen related data collection procedure. The controller and software are configured to operate in tandem in one embodiment to provide rapid access to commonly used functions associated with a given optical coherence tomography image dataset with a minimal amount of actuation. The surfaces of the controller and input components are prepared for use beneath a sterile drape while wearing medical gloves in one embodiment. The surfaces can include ridges or other surface features that facilitate gripping and actuation of input devices beneath a sterile drape. The controller and software are designed to operate with generalized software drivers such that they can be used with a plurality of configurations of a given image data collection system. The controller can also be used as a mobile data collection system console such that remote control of such as system is handled via the controller.

The controller and GUI combination allows the user to rapidly review and manipulate data such as OCT and FFR data without the need for actions, such as mouse clicking and dragging. These actions and others that are awkward to perform beneath a sterile drape are avoided or easier to perform using the controller. This is achieved primarily by using a joystick that can be twisted clockwise and counter-clockwise in addition to being moved in a conventional XY motion. The controller includes a wireless communication device. Thus, in one embodiment, the controller can link wirelessly to a mobile data collection system to provide the user with control near or remove from a patient or procedure room.

Figure 1B:
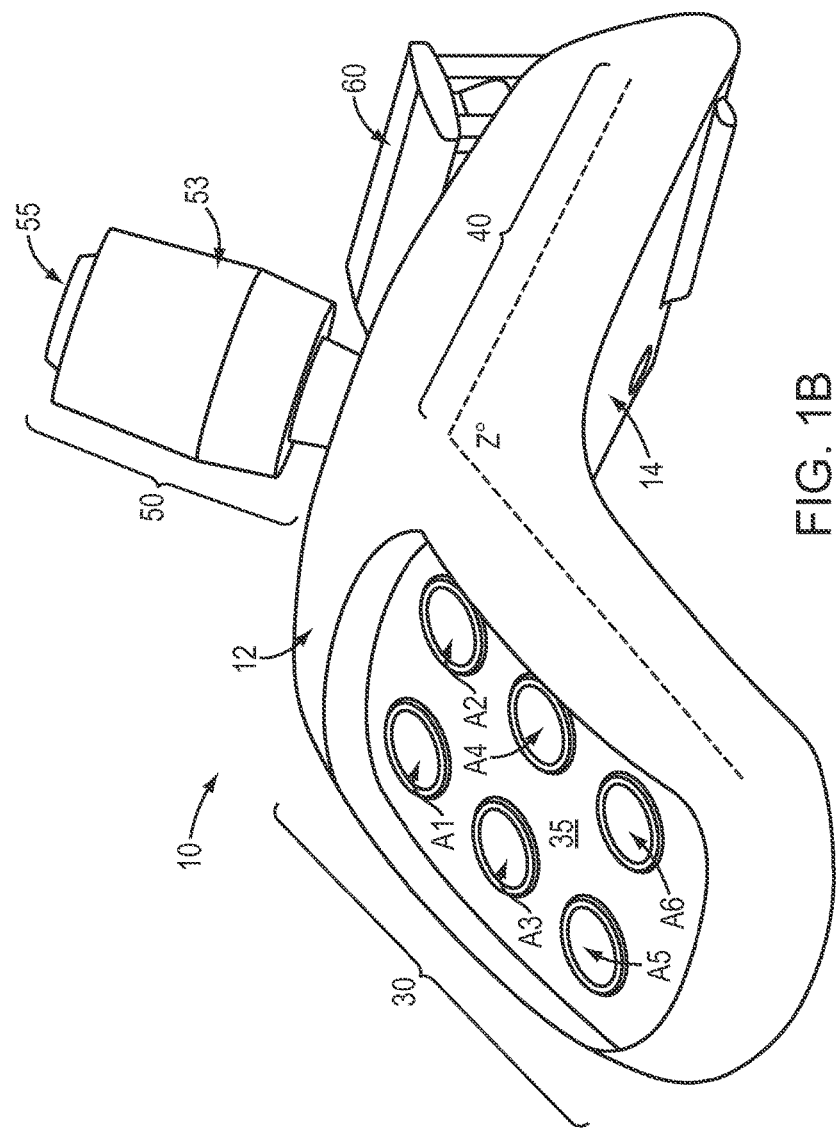
FIG. 1B is a perspective view of a controller in accordance with an illustrative embodiment of the invention.

An exemplary embodiment of a controller suitable for controlling one or more functions of a data collection system such as its display or image data navigation function is shown in FIG. 1B. The controller includes a housing, such as an outer shell, which can be a continuous housing or be formed from a plurality of housing components. For example, the housing can include an upper housing 12 and a lower housing 14. The controller 10 is shaped to present one or more input devices to a user such that ease of use and comfort are facilitated by the angled orientation of one or more input devices. The controller 10 can have a hockey stick, elbow or L shaped configuration when viewed from a side. Notwithstanding the forgoing, the controller can have various surface geometries and angled sections configured to present various input devices such a as joystick and inputs such as buttons or switches at an ergonomic angle. The forward bias of the joystick enhances actuation and improves ergonomics during a procedure.

As shown in FIG. 1B, the input devices are disposed along different sections of the controller. Exemplary control devices including buttons or switches A1 to A6 are shown arranged in one section of the controller. Another input device can include an actuatable elongate member 50 such as XYZ joystick with a rotatable knob. The elongate member 50 can include a cover or grip 53. A button 55 can be disposed on or in a surface of the cover 53. This member 50 can be twisted and the button can be configured to operate a mouse button when interacting with interface 27.

In turn, the housing such as upper housing 12 can define one or more holes or cavities. These holes can be sized and arranged to allow switches and a joystick such as elongate member 50 to be accessible by a user. The controller includes an attachment device 60 suitable for attaching the controller or a controller dock to a support such as a table, bed, gurney or other suitable support. In one embodiment, the elongate member 50 is a joystick that includes a forward tilt bias. The forward tilt bias of the joystick substantially improves ergonomics over existing devices such as trackballs and XY joysticks.

In one embodiment, forward tilt bias refers to the feature that a component of the controller such as a joystick or other pointing device is disposed on a plane or structure tilted as angle relative to the floor, the surface of a support structure disposed on the floor, or a plane parallel to either of the foregoing. For example, in one embodiment, a pointing device with an elongate member such as the post of a joystick that has a forward tilt bias is positioned such that a user of the device's hand bends toward the floor with a reduction in strain in contrast with the hand bending upwards with an associated increased level of discomfort and strain at the wrist associated with a backward bias. This is advantageous to the operator of the controller because the operator's hand rests at a natural position when manipulating the controller, improving the ergonomics of operation. The panel containing the buttons A1 to A6 may have a reverse tilt bias in order to prominently display the buttons A1 to A6 to the user such that they are not obscured.

The controller can have various shapes and oriented sections configured to present the user input devices such as buttons or a joystick to a user. As shown, the controller can include a user facing section 30 and a support facing section 40. In one embodiment, these sections do not have an absolute starting or an ending point, but come together at a bend or joint that resembles an elbow shape. The angle Z at which these two sections are positioned relative to each other can be obtuse or acute depending on the embodiment. Z ranges from about 45 to about 180 degrees in one embodiment. The user facing section is tilted at an angle to a user to facilitate hand actuation. This angle is maintained when the controller is attached to a support such as via a support member 15.

Figure 1C:
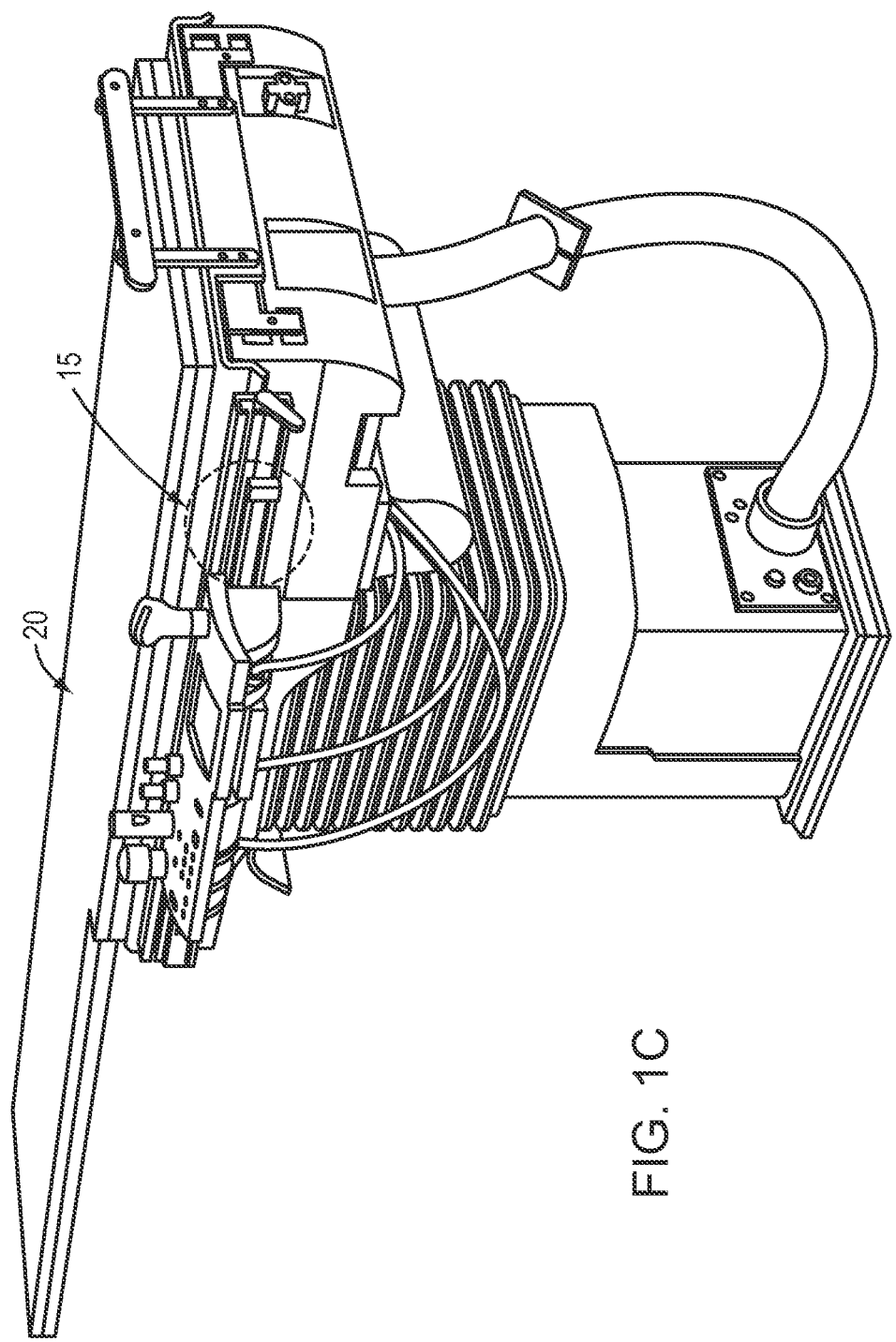
FIG. 1C is a perspective view of a support suitable for receiving a controller and the controller being releasably secured thereto in accordance with an illustrative embodiment of the invention.

In one embodiment, the support facing section 40 is tilted at an angle to the support, but is positioned to allow access to an input device. In one embodiment, an attachment device 60 is at one end of the controller, a first input device is at the other end of the controller, and in between the first input device and the other end of the controller a second input device is positioned. In one embodiment, the second input device is positioned in the vicinity of the bend between the two sections of the controller. The attachment device 60 can attach to the support 20 or support member 15 shown in FIG. 1C in one embodiment.

Figure 2A:
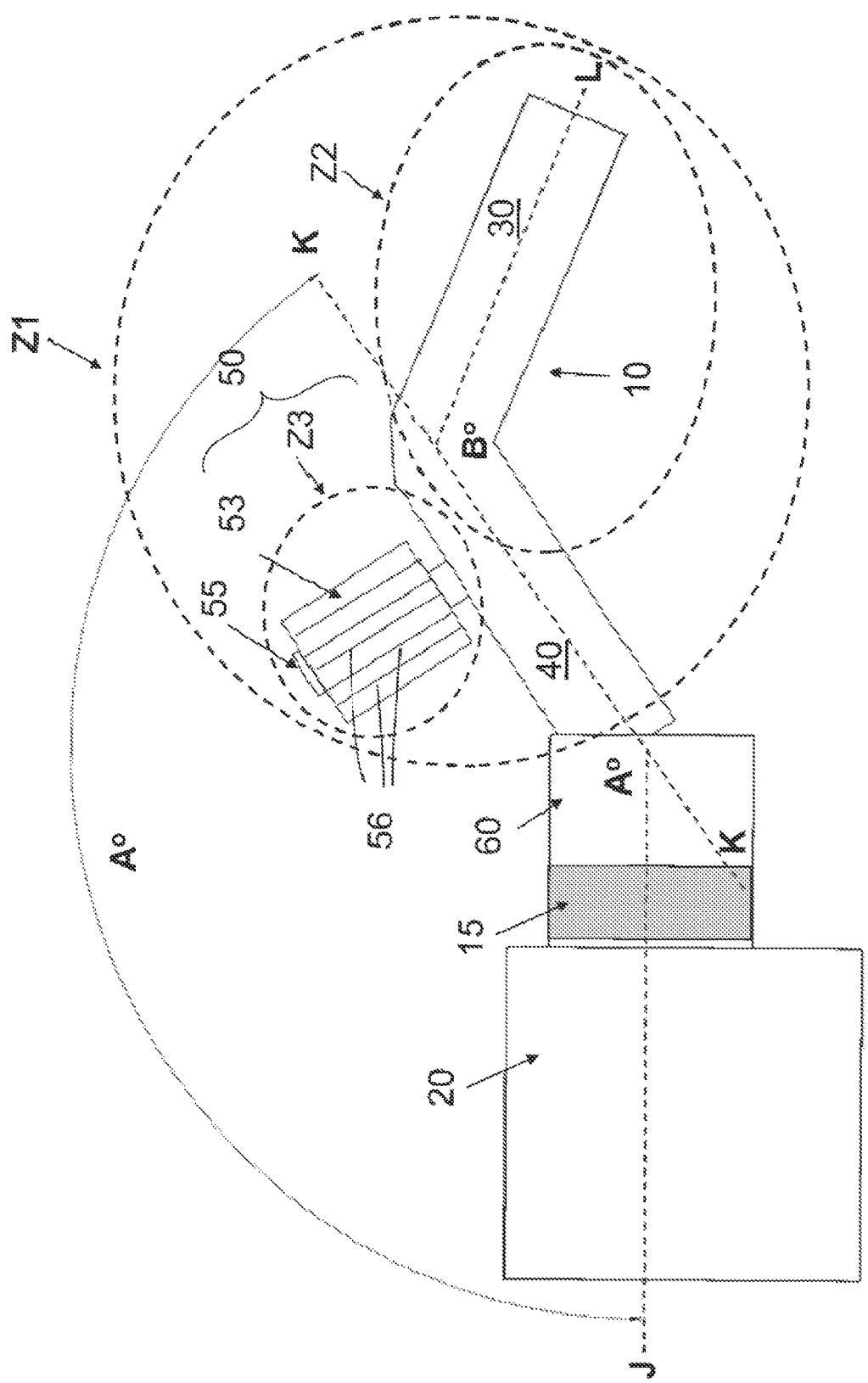
FIG. 2A is a schematic view of a controller and various zones in accordance with an illustrative embodiment of the invention.
Figure 2B:
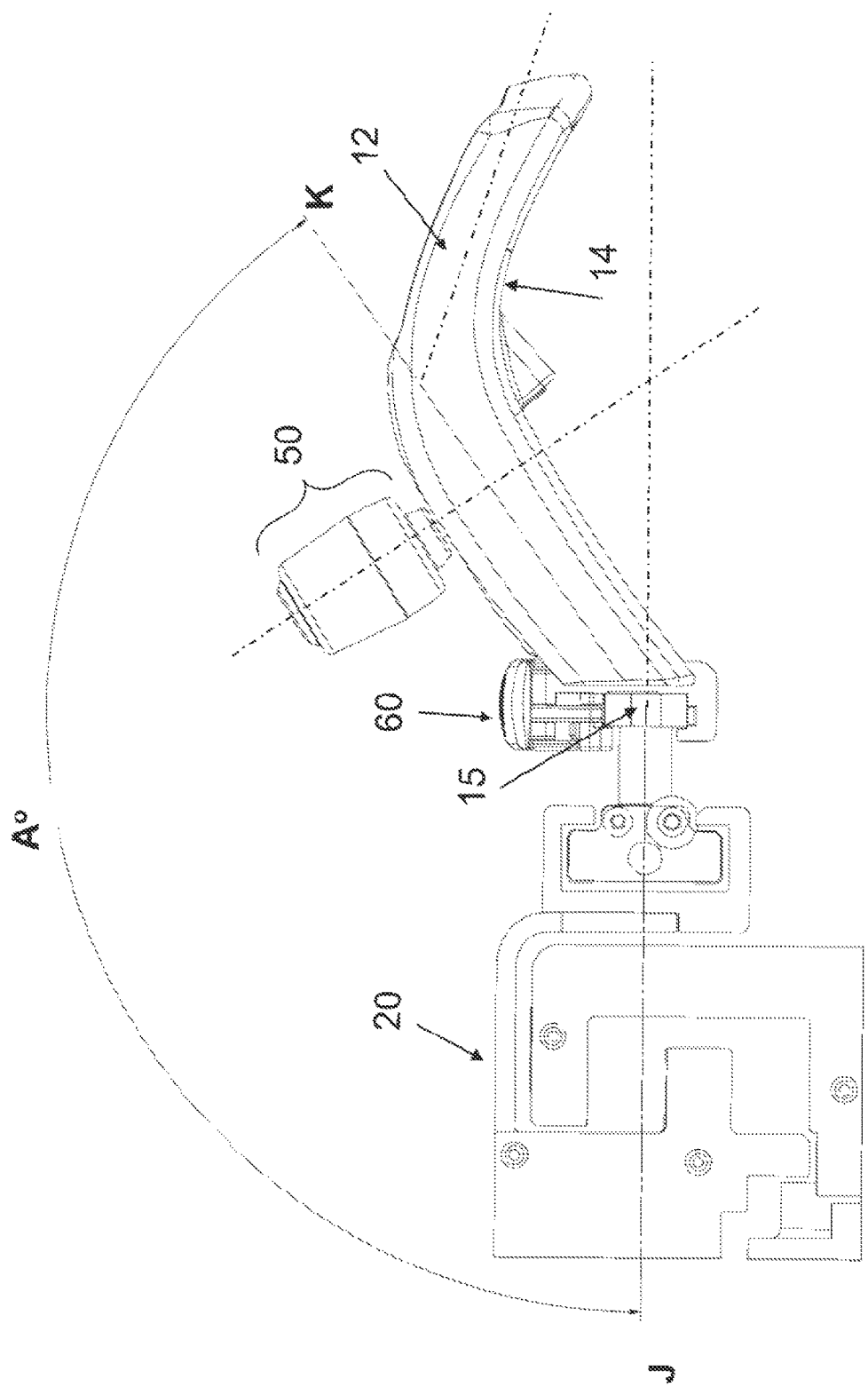
FIG. 2B is a perspective view of a controller in accordance with an illustrative embodiment of the invention.

FIG. 2A shows a controller 10 with various reference segments J and K and L and zones Z1, Z2, and Z3. The angle between segment J and K is A degrees. The angle between segment K and L is B degrees. A can range from about 110 to about 180 degrees. B can range from about 45 to about 180 degrees. Segments K and L can be drawn along a midline or another line that spans sections 30 or 40 in one embodiment. Segment J can be positioned in a plane parallel to the support 20 in one embodiment.

The elongate member 50 can include a knob having an outer cover or grip 53. The outer cover 53 can be a pliant deformable material such as rubber or plastic and can include grip structures 56 such as ridges, bumps or indentations. The elongate member 50 is disposed in zone Z3 in one embodiment. Another input device such as one or more buttons is disposed in zone Z2 in one embodiment. Zone Z1 represents a sterile zone such as can be achieved using a sterile drape. FIG. 2C shows another controller 10 embodiment. Zones Z1 and Z2 can be arranged to form ergonomic input zones that are presented to a user based on the angle at the attachment region of the attachment device 60 and the support 20 and the shape of the controller 10.

Figure 3A:
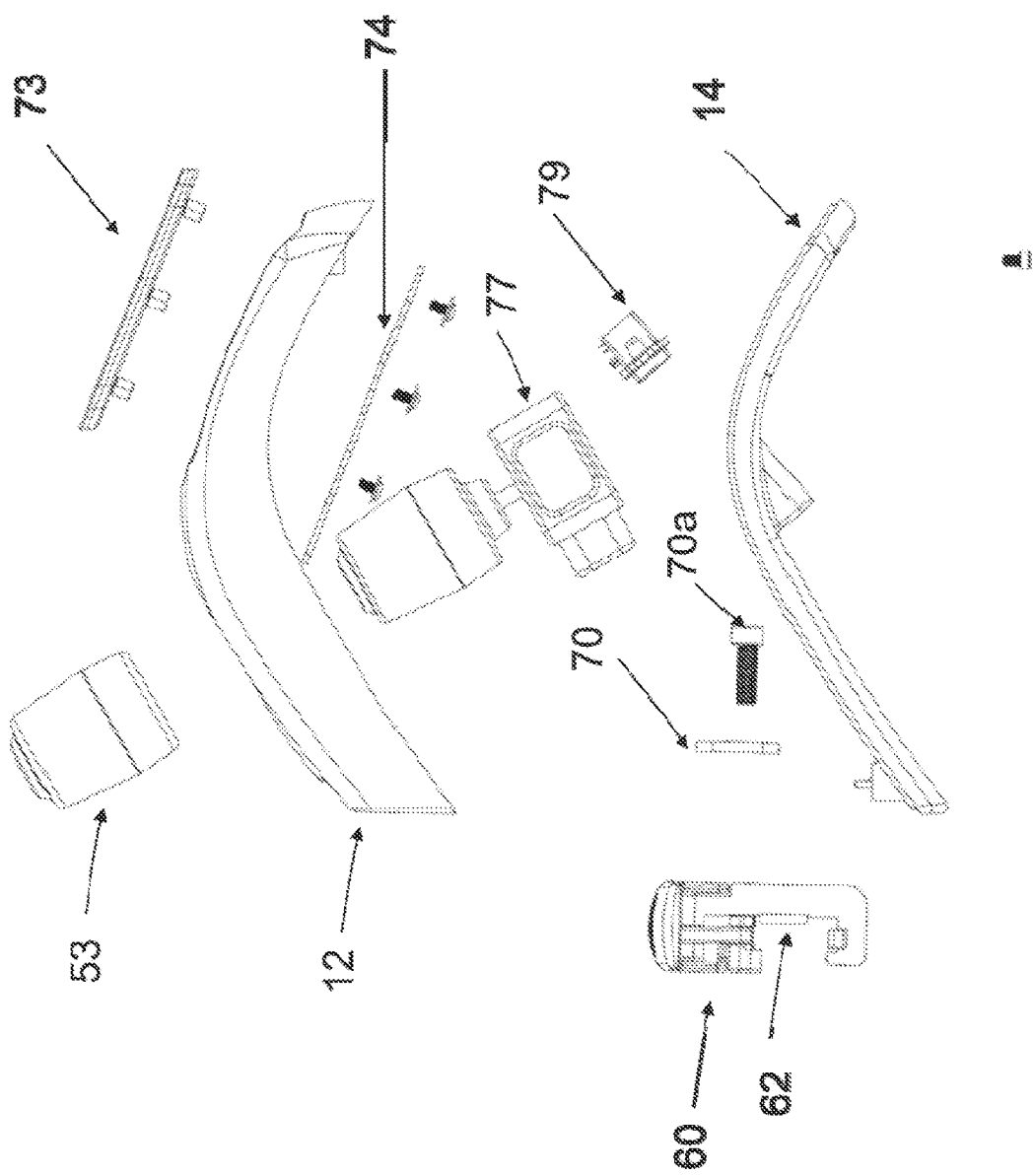
FIGS. 3A-3E are various perspective views of a controller in accordance with an illustrative embodiment of the invention.

FIGS. 3A-3E show various perspective views of another controller embodiment. As shown in the figures, various subsystems, components, holes, cavities, and fasteners are shown. These are provided as example embodiments. As shown in FIG. 3A, the upper housing 12 and the lower housing 14 can be separated and attached using various fasteners F. When attached, the housings 12, 14 are connected to attachment device 60, which is a clamp in one embodiment. The attachment device 60 includes an attachment zone 62 for connecting to a support 20 or support member 15. An attachment plate 70 and a faster 70a can be used to engage and secure the attachment device 60 to the controller. An interface plate 73 can also be disposed in the recessed region 35 of housing 12.

Figure 3B:
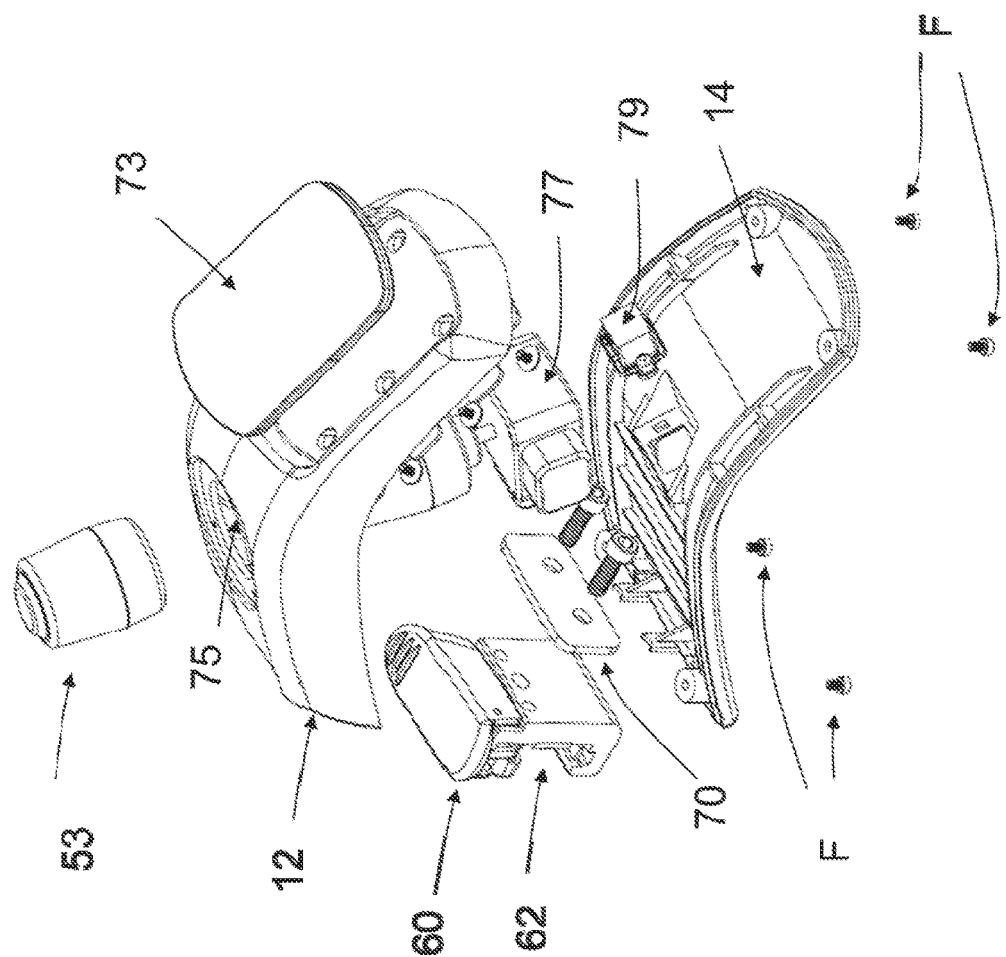

A backplate 74 can be attached on the other side of housing 12 to secure the interface plate 73. This interface plate 73 can define holes for buttons as shown in FIG. 1B. A joystick module 77 can also be sandwiched between the upper housing 12 and lower housing 14. An electronics and connector module 79 which can contain a programmable processor or other circuitry can also be disposed in between the two housings 12, 14. \As shown in FIG. 3B, a hole 75 is defined by the upper housing 12 to receive the elongate member 50 which is formed from the joystick module 77 and cover 53 in one embodiment. Various fasteners F can be used to secure the upper and lower housings.

Figure 3C:
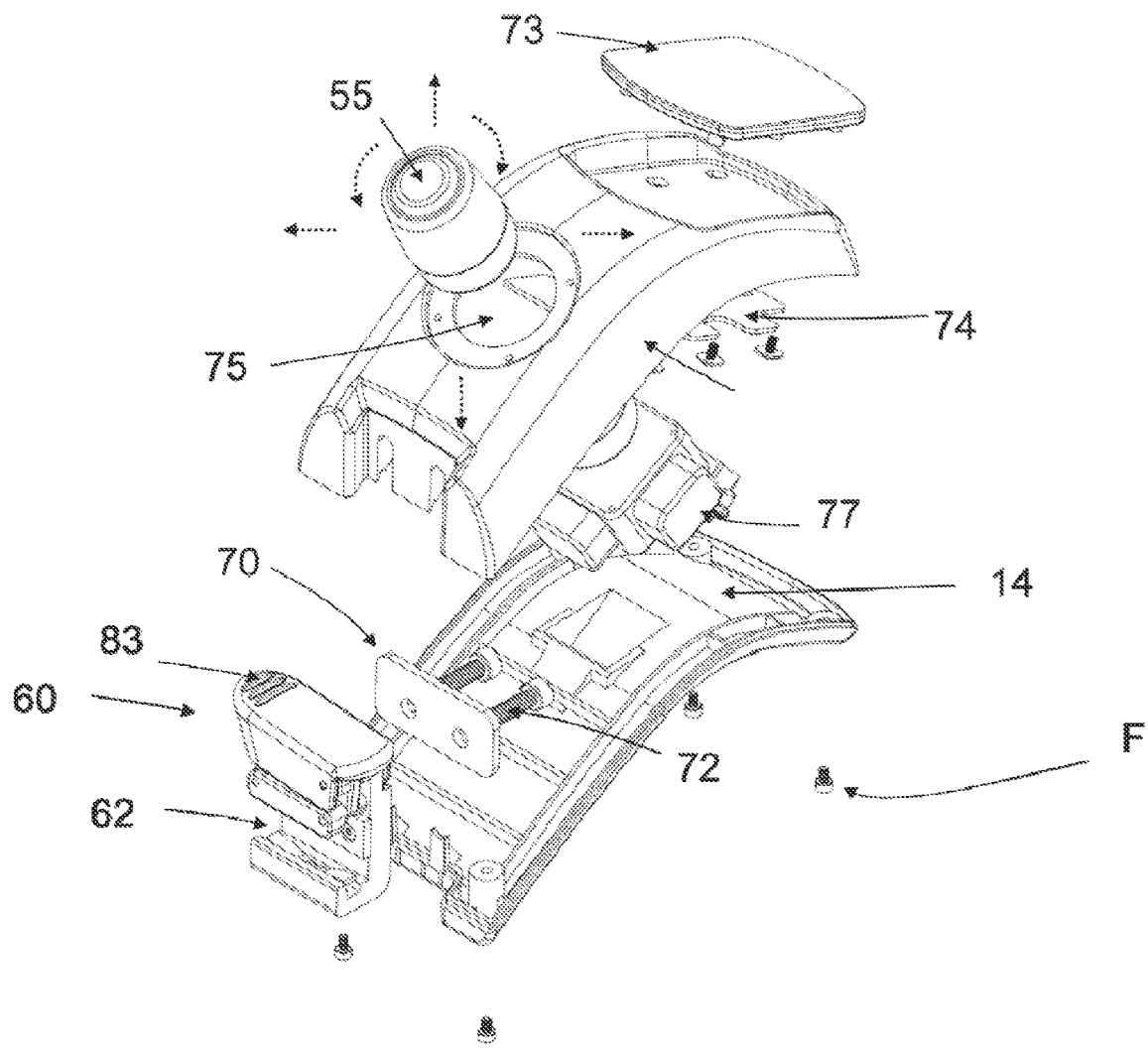
Figure 3D:
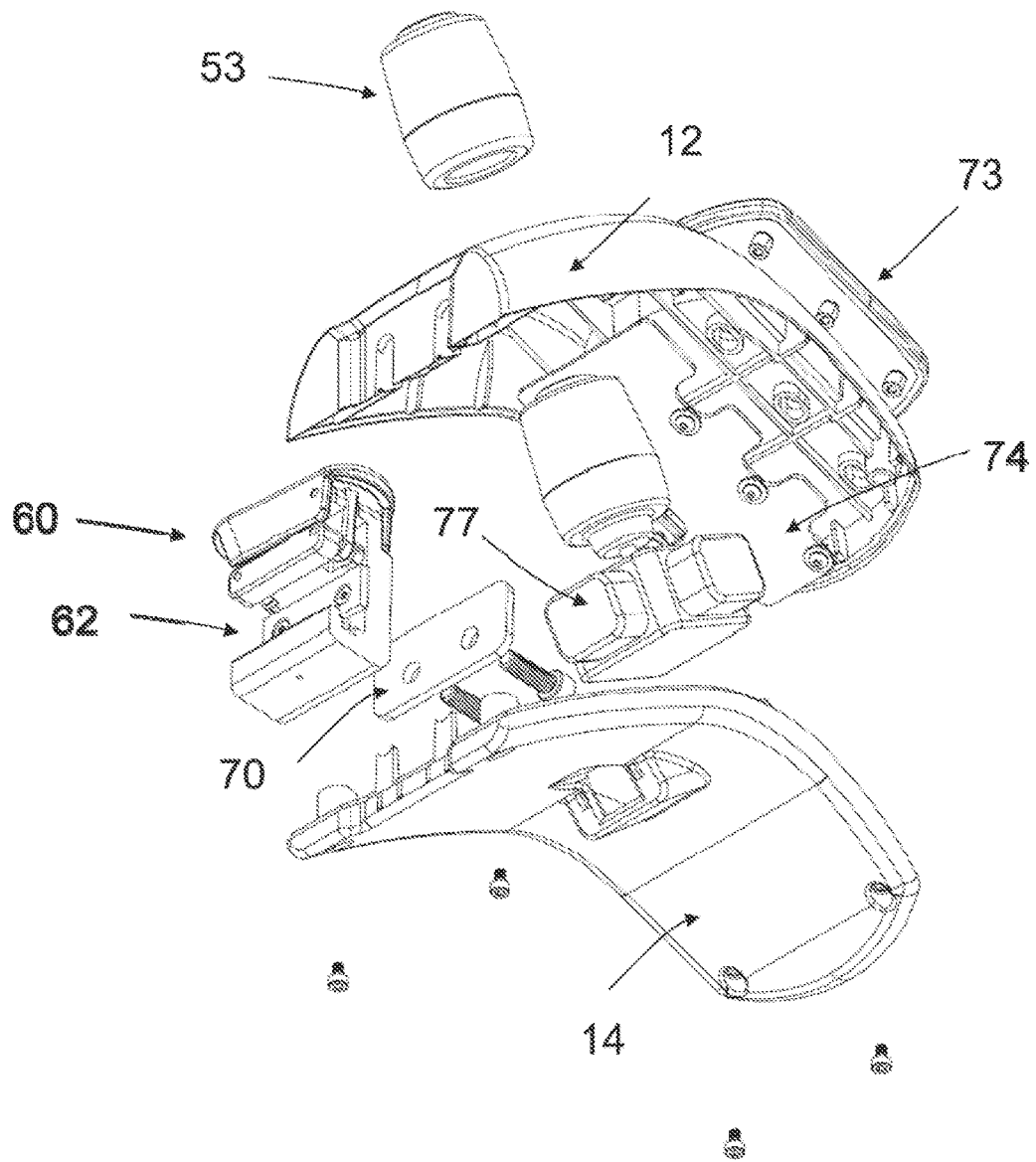
Figure 3E:
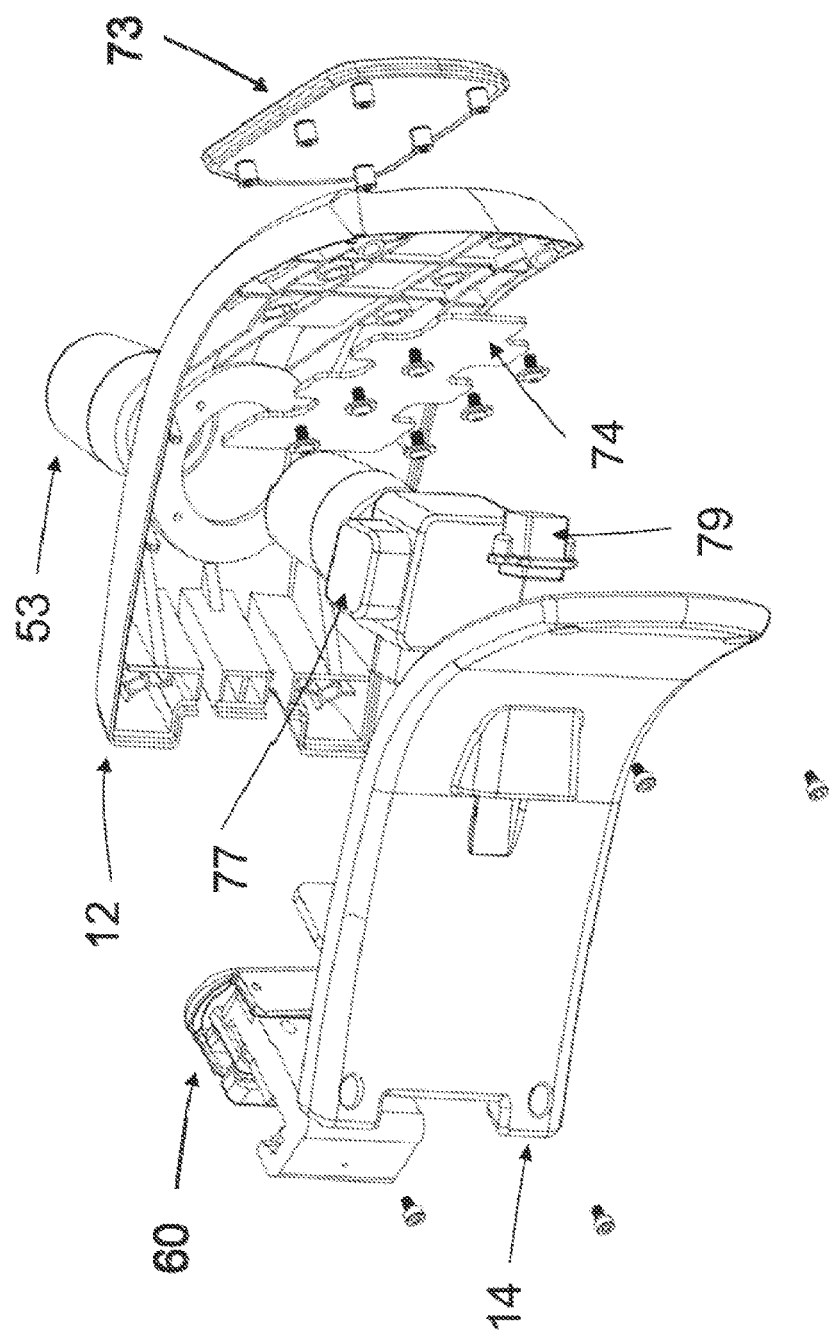
Figure 4D:
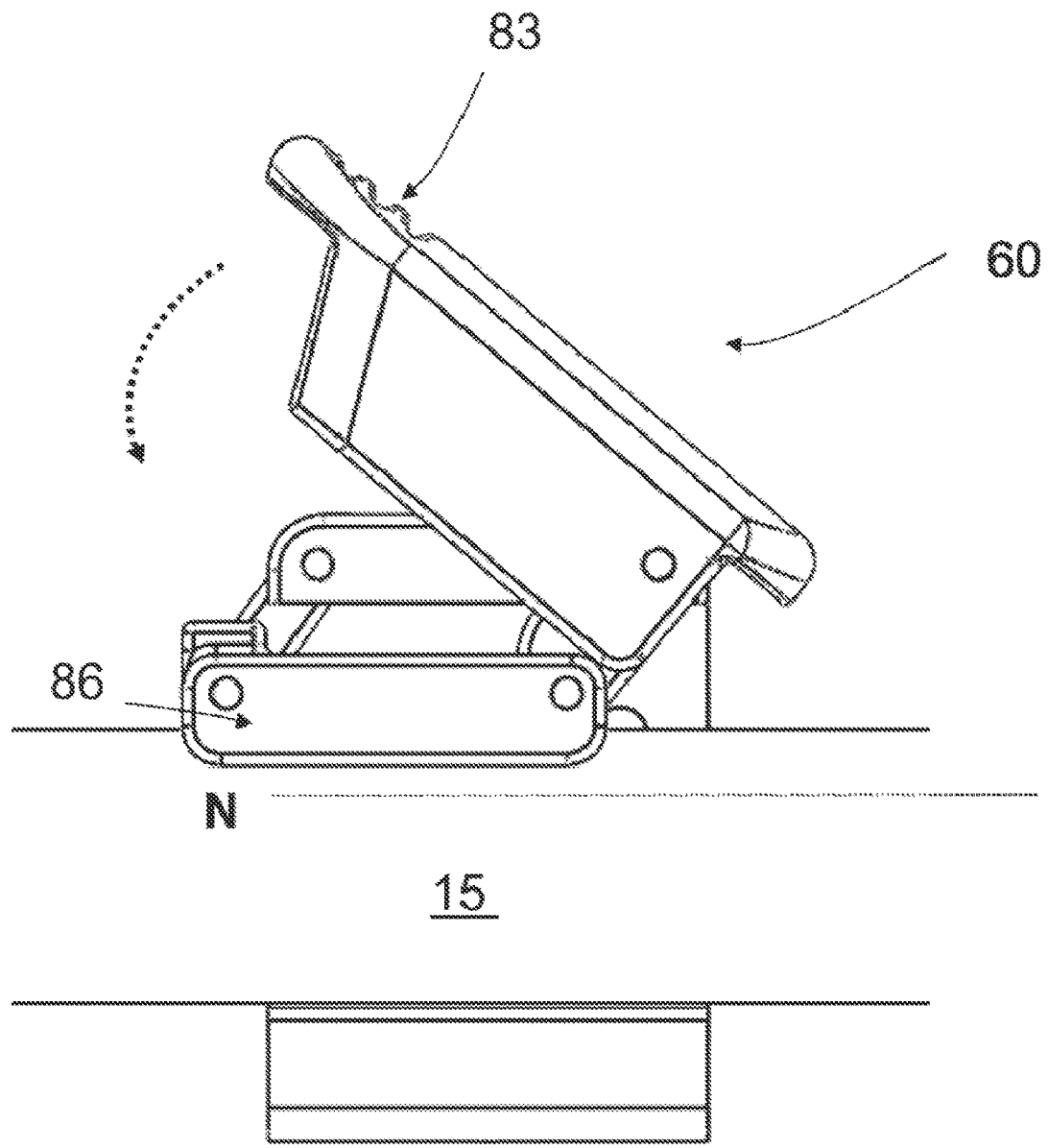
Figure 5C:
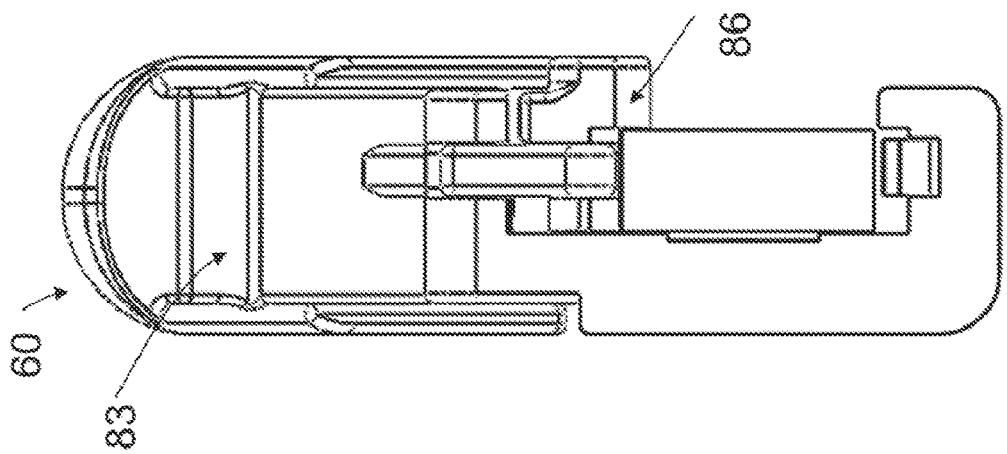
FIGS. 5A-5C are various perspective views of an attachment device of a controller in accordance with an illustrative embodiment of the invention.
Figure 5B:
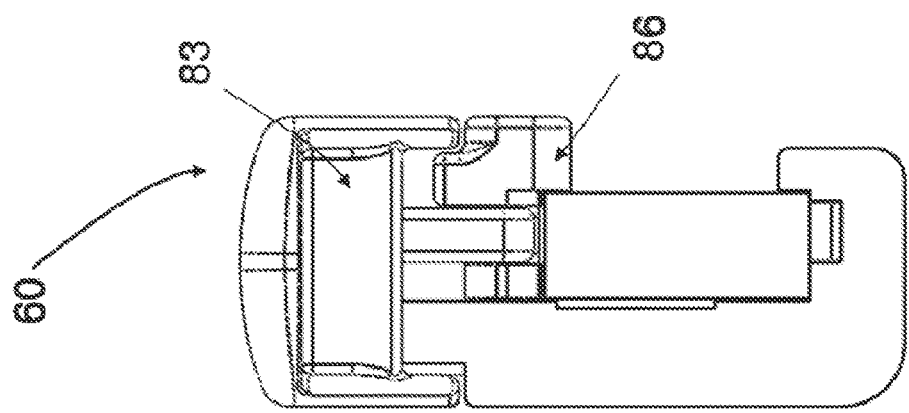
Figure 5A:
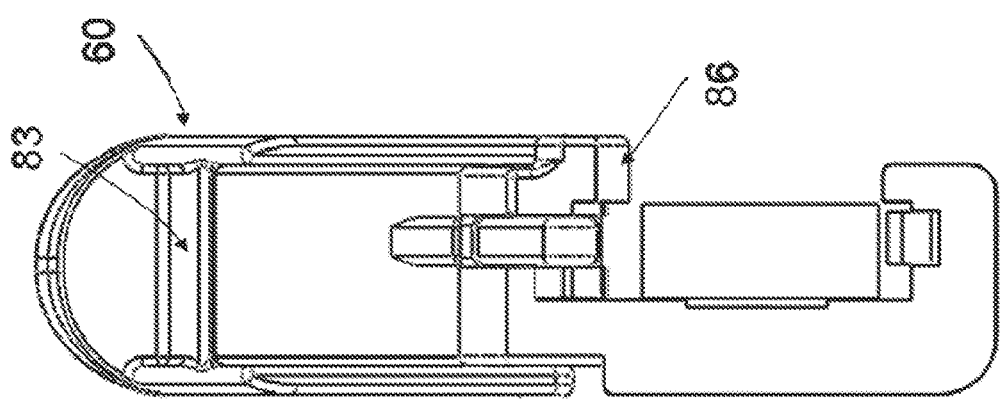
Figure 5E:
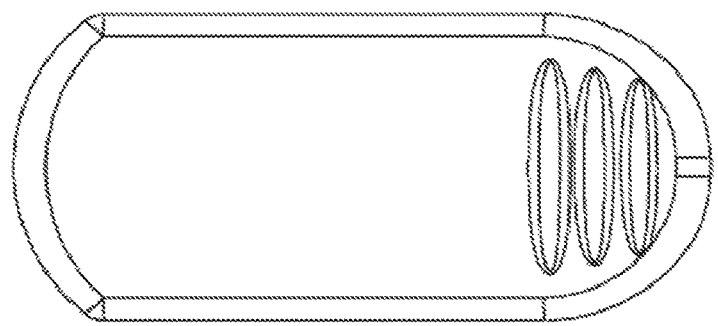
FIGS. 5D-5P are various additional views of an attachment device of a controller in accordance with an illustrative embodiment of the invention.
Figure 5D:
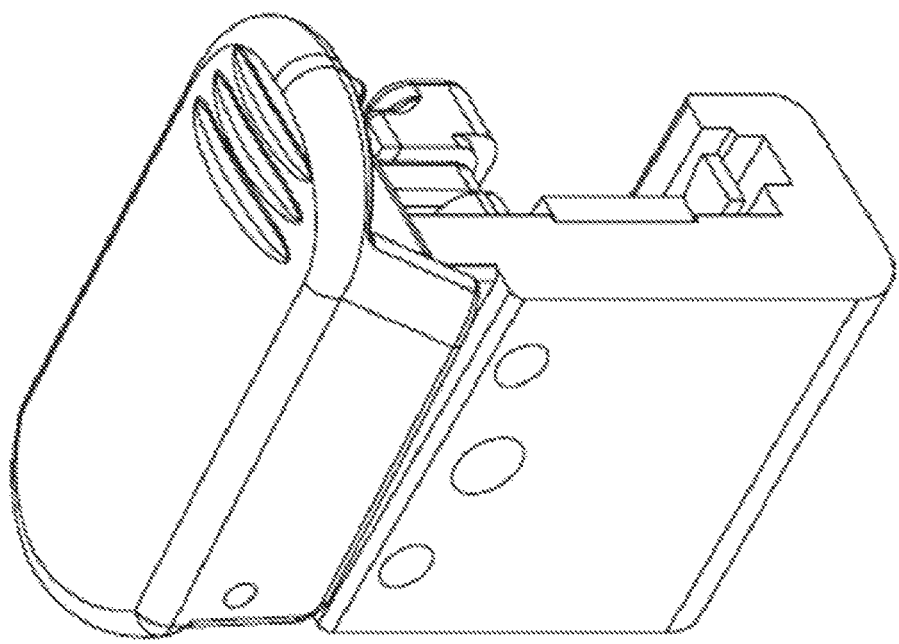
Figure 5G:
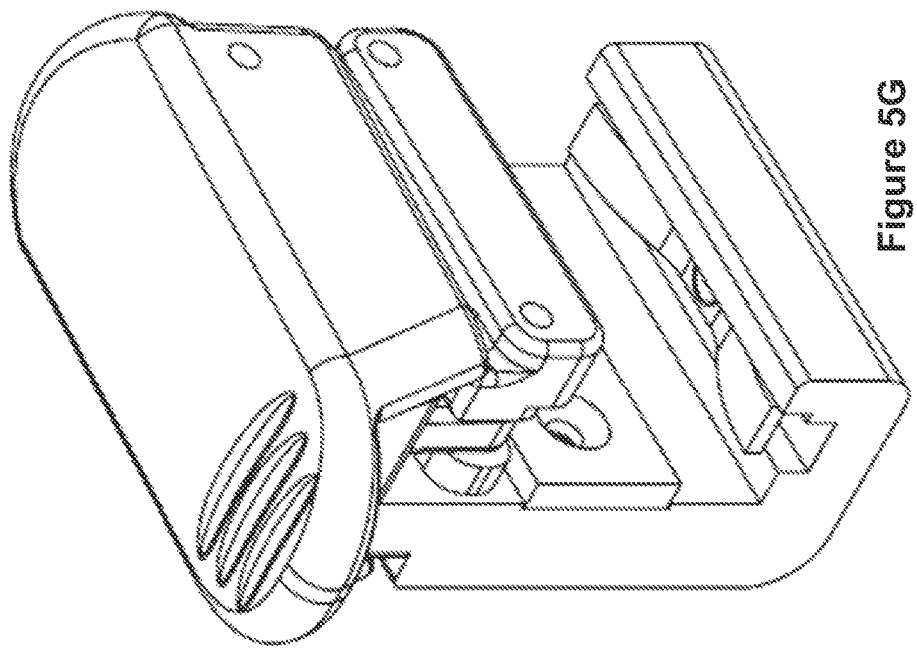
Figure 5F:
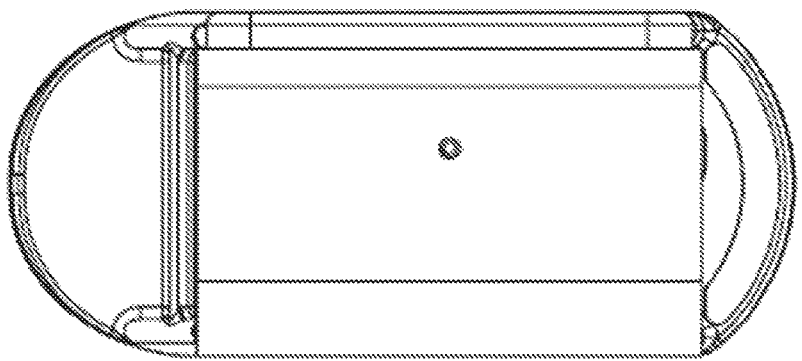
Figure 5I:
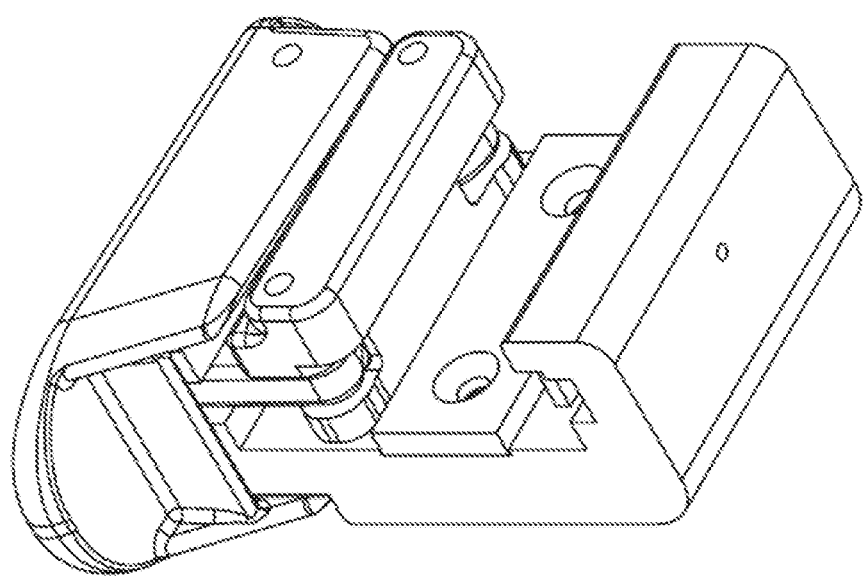
Figure 5H:
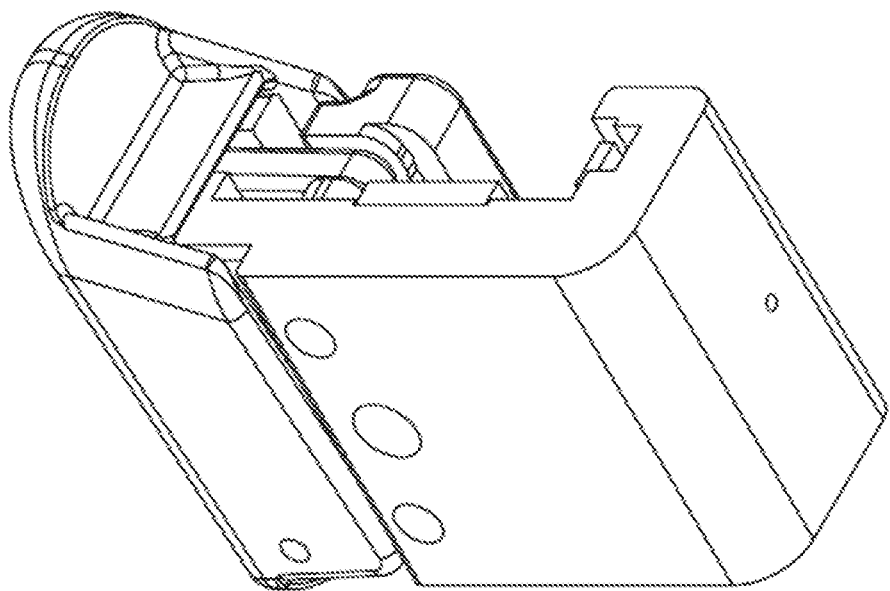
Figure 5K:
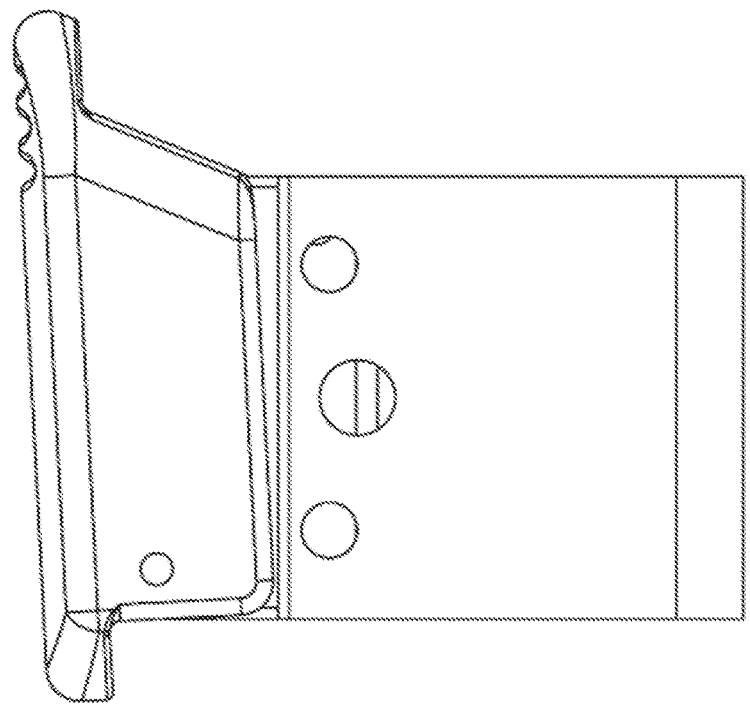
Figure 5J:
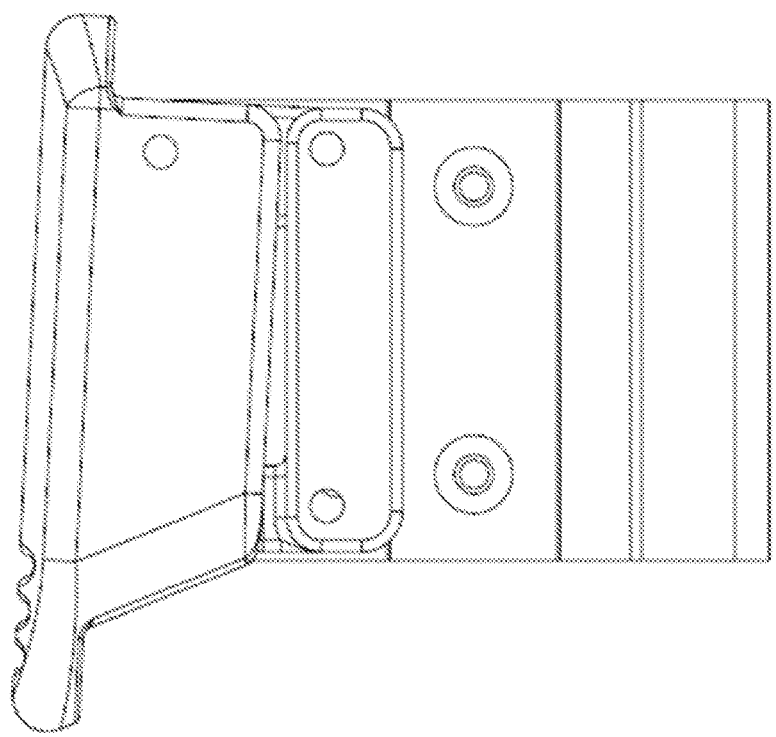
Figure 5M:
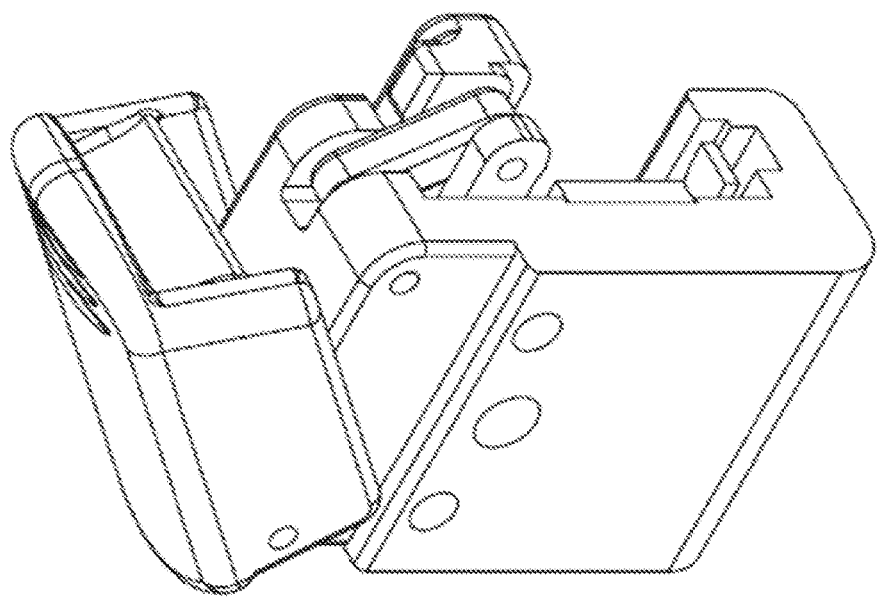
Figure 5L:
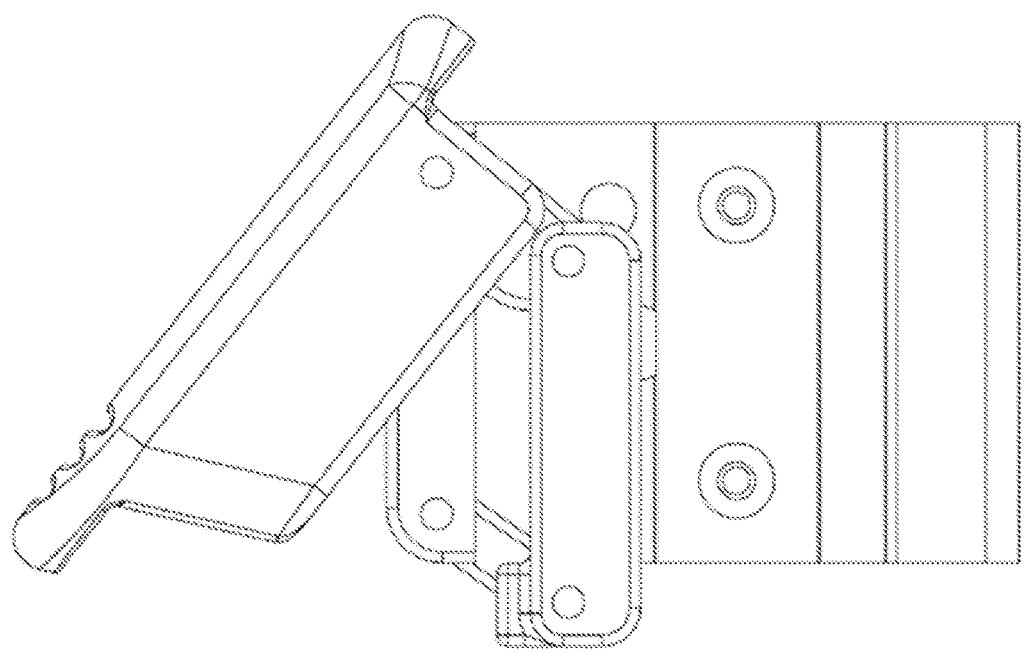
Figure 5O:
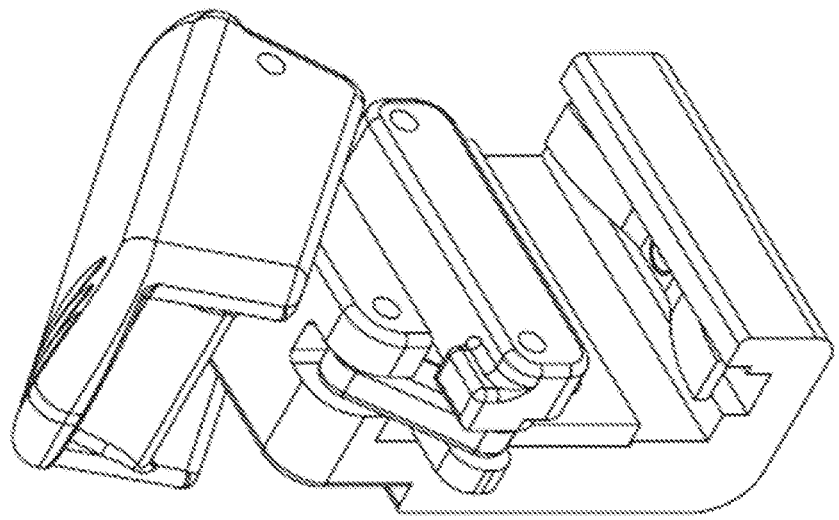
Figure 5N:
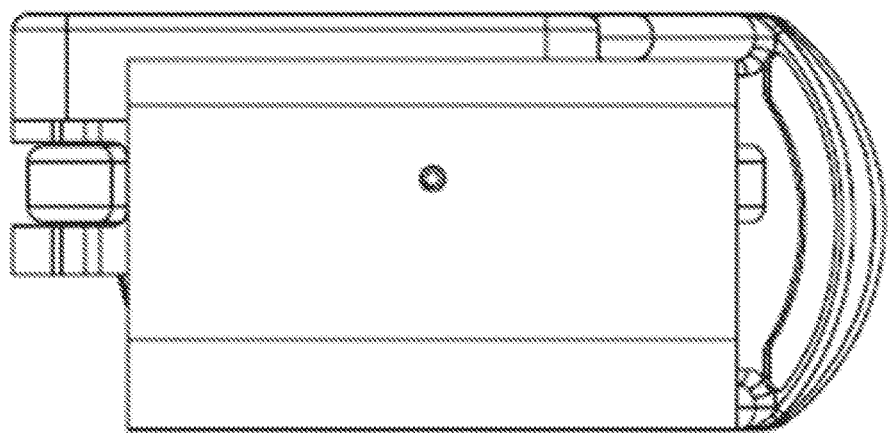
Figure 5P:
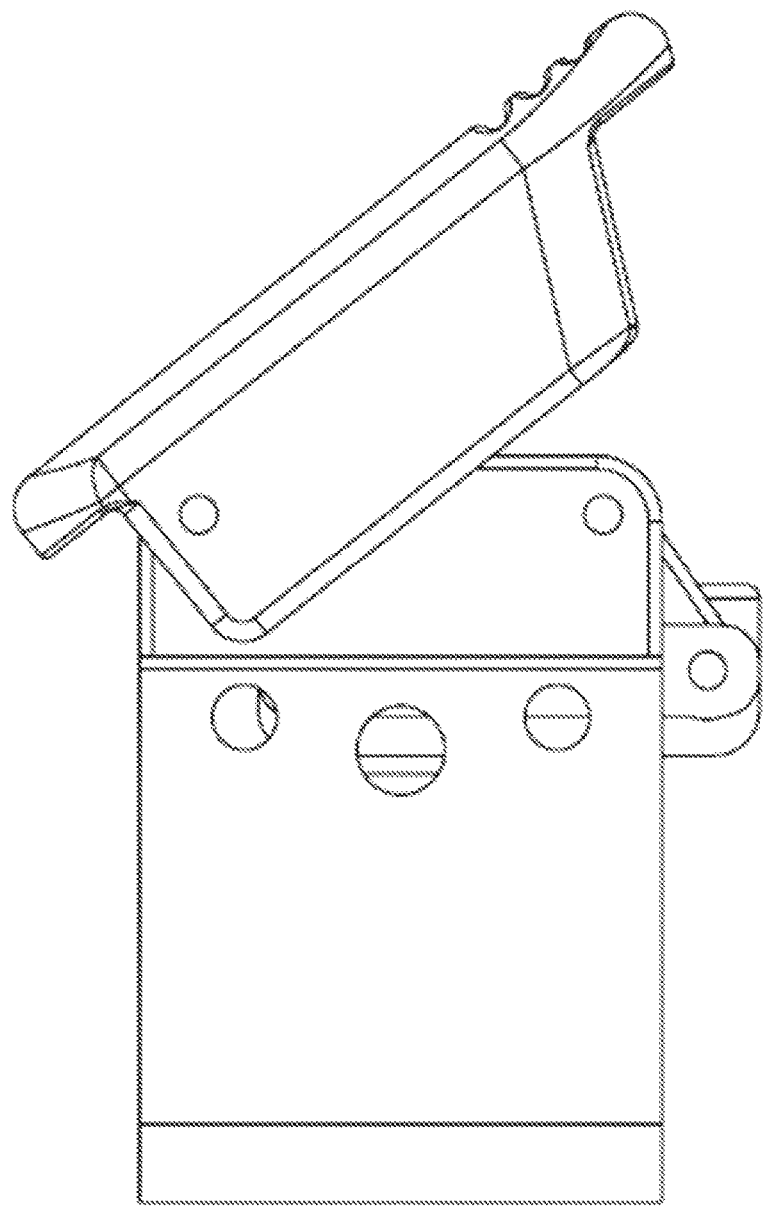

FIG. 3C shows a controller embodiment with various arrows indicating the rotatable nature of the elongate member. The top button 55 is also shown for the knob or top portion of the elongate member. The attachment device 60 is shown in a secured or closed configuration. A ridged region 83 of clamp 60 configured for pressing upon by a user is also shown. FIGS. 4A-4D show different states of the attachment device 60. Specifically, FIG. 4A and FIG. 4B show open and closed states, respectively. FIG. 4C shows a perspective view of the closed or secured state. FIG. 4D shows a transition state between open and secured for the attachment device 60 as the device 60 is partially engaging support member 15 using slidable member 86. Another view of this transition state is shown in FIG. 5C. The secured state in FIG. 4B is shown from another view in FIG. 5B. FIG. 5A shows another view of the attachment device 60 of FIG. 4A corresponding to the open state. FIG. 5D-5P also show additional views of the attachment device 60.

Figure 6:
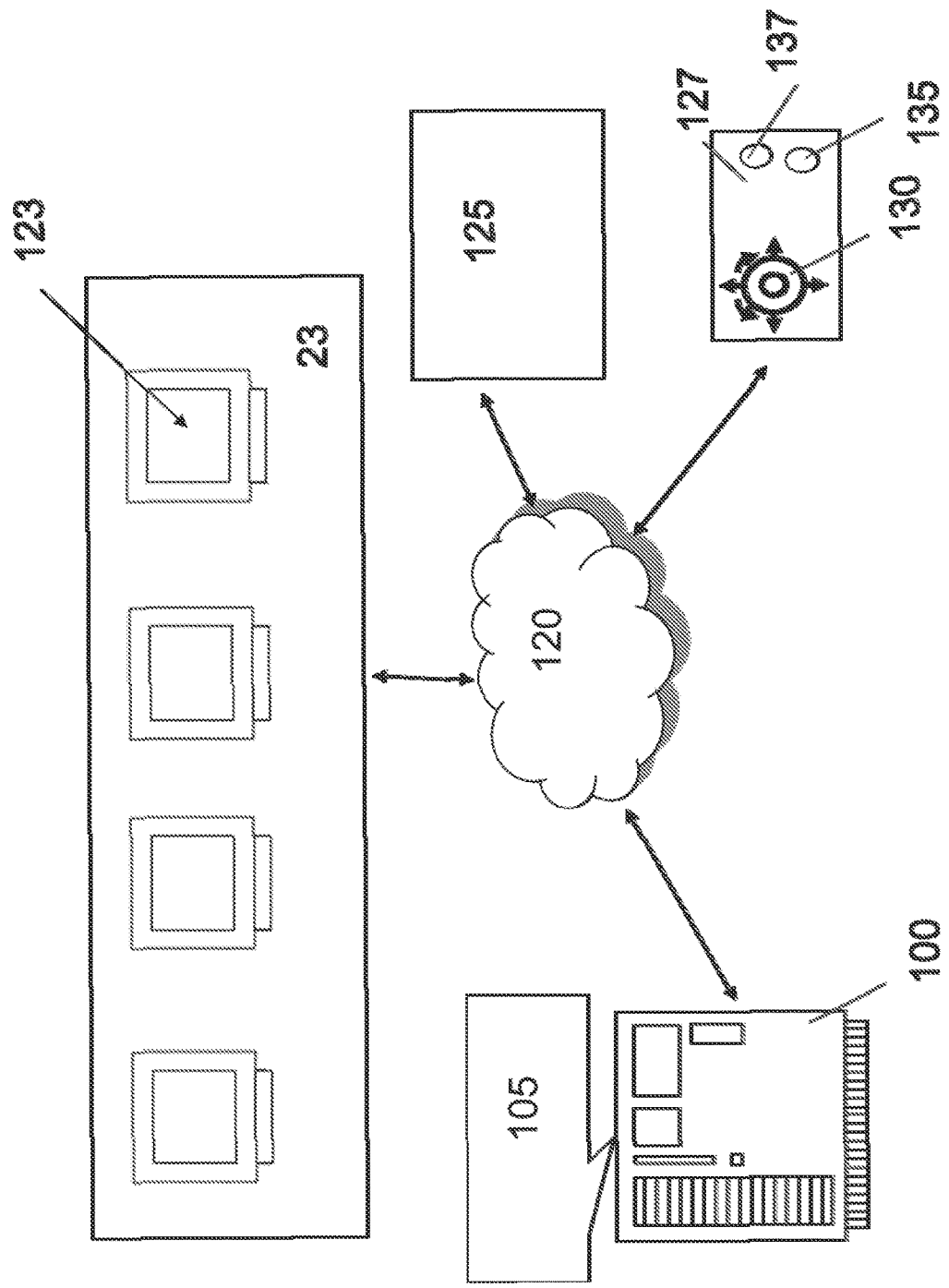
FIG. 6 is a data collection system, control software, and related subsystems in accordance with an illustrative embodiment of the invention.

FIG. 6 shows a system suitable for displaying data obtained from a data collection procedure such as an OCT procedure performed in a catheter lab such as the one shown in FIG. 1A. A computing device 100 such as server can be part of a data collection system 125 or receive data from such a system 125. The system 125 can be connected to a network 120. In one embodiment, the computing device includes memory storage which includes image data such as cross-sectional views of a blood vessel. The computing device 100 includes machine readable medium or other memory that includes one or more software modules 105 for displaying a graphical user interface such as interface 123. The interface can include a plurality of panels, menus or other displayable regions. These panels or regions can be displayed on one or more monitors 23. The computing device can exchange data such as image data with the monitor 23 using a network 120 which can include one or more wired, optical, wireless or other data exchange connections.

A controller 127 which can include any of the controllers described herein can be in wired, optical, or otherwise in communication with the other devices or systems shown over the network 120. The controller 127 can include an XYZ joystick component 130 and one or more buttons 137,135. The controller can be used to send command signals to the computing system 100 which is running the interface 123. The interface 123 can display data from the system 125 or other sources of data. The interface 123 can include one or more menus and other sections that change in response to control signals from controller 127. The controller 127 can include a processor or suitable programmable ASIC. The control signals can be sent over the network 120 or via another connection.

The computing device 100 may include a server computer, a client user computer, a personal computer (PC), a laptop computer, a tablet PC, a desktop computer, a control system, a microprocessor or any computing device capable of executing a set of instructions (sequential or otherwise) that specify actions to be taken by that computing device. Further, while a single computing device is illustrated, the term "computing device" shall also be taken to include any collection of computing devices that individually or jointly execute a set (or multiple sets) of instructions to perform any one or more of the software features or methods such as interface 123.

Figure 7A:
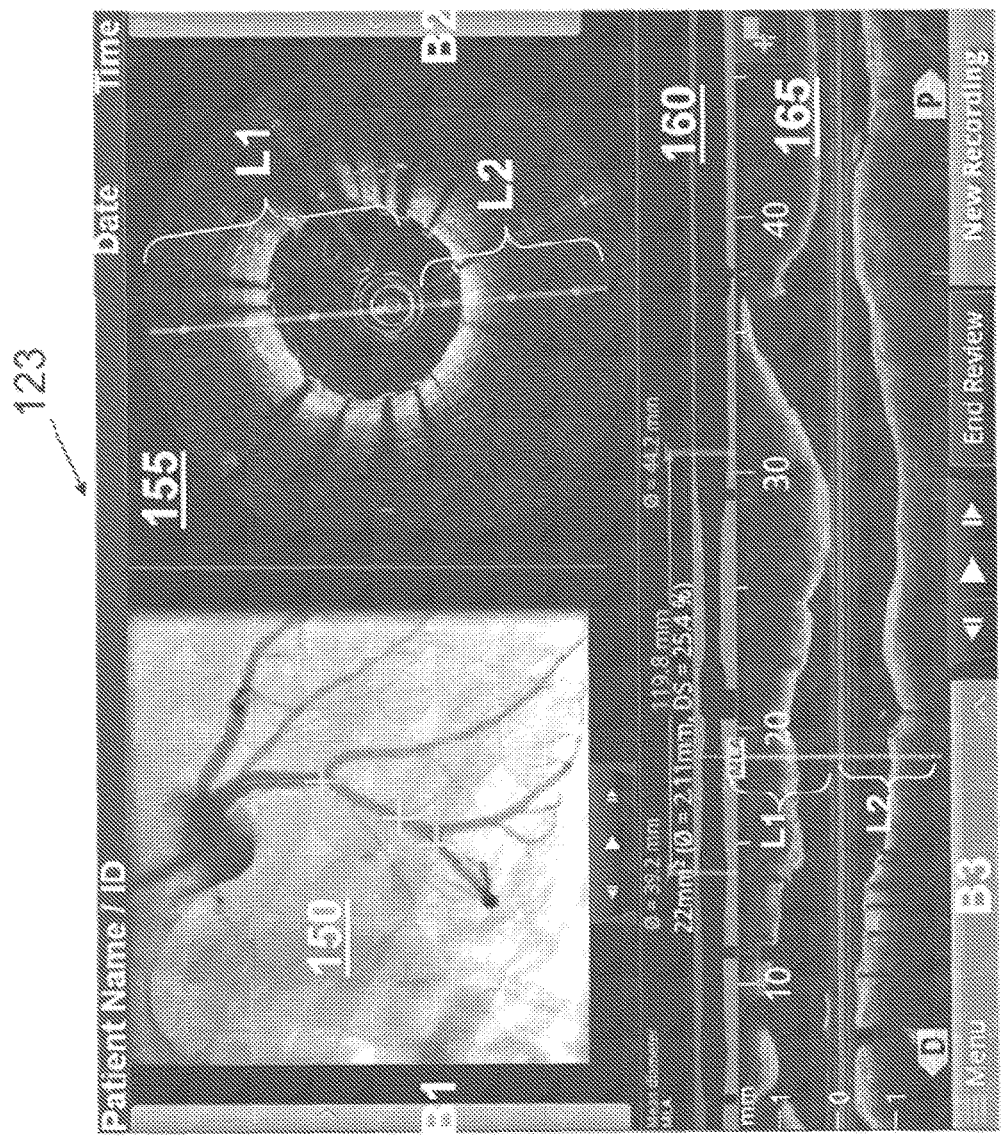
FIG. 7A is a graphic user interface displaying cardiovascular data in accordance with an illustrative embodiment of the invention.
Figure 7B:
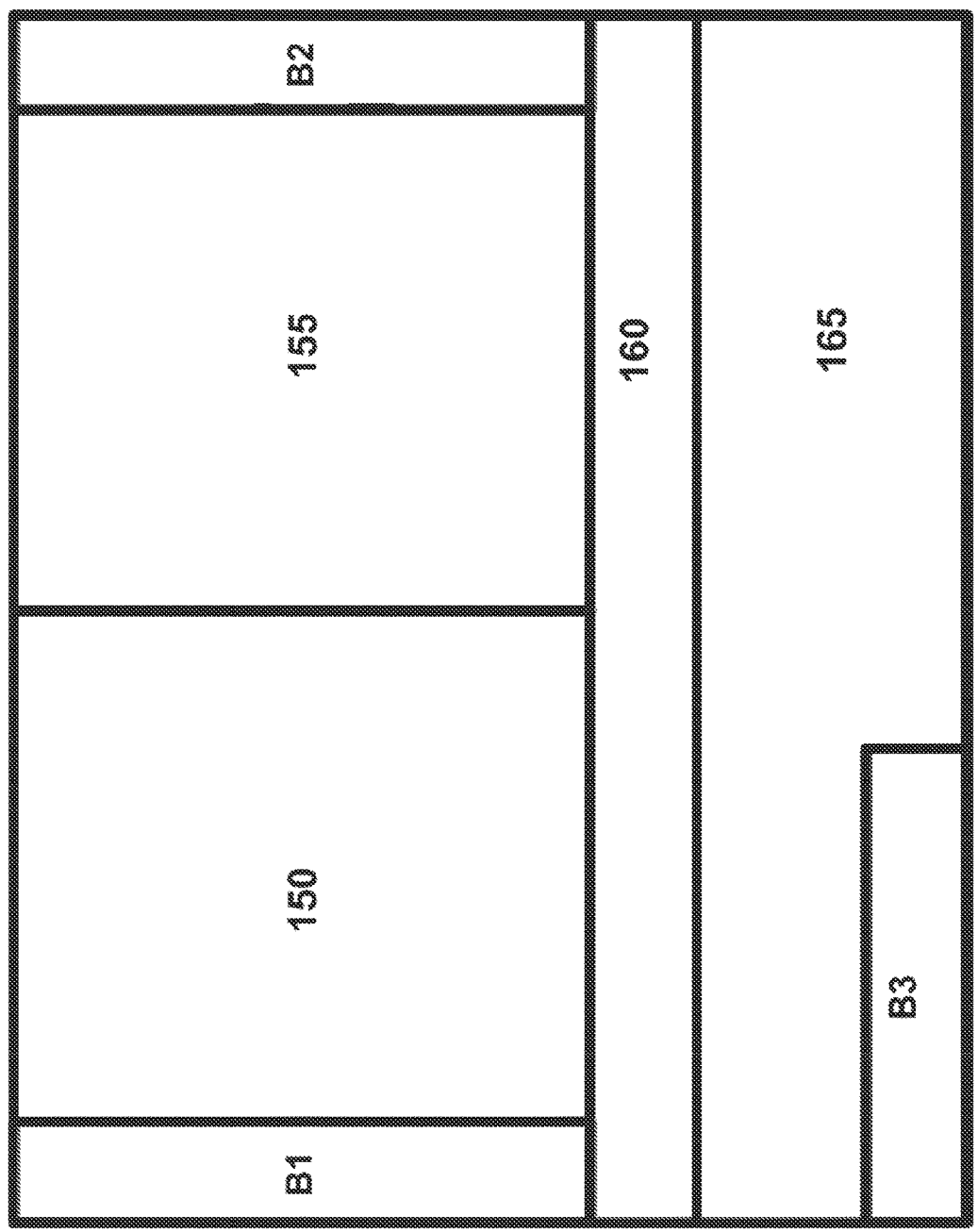
FIG. 7B is a graphic user interface in accordance with an illustrative embodiment of the invention.

FIGS. 7A and 7B shows a representation of a graphic user interface 123. The interface 123 includes a plurality of panels. As shown, there are four main panels 150, 155, 160, and 165 in one embodiment. These include an auxiliary display panel 150 which shows angiography data in this embodiment, a cross-sectional view or B mode display panel 155, a lumen profile panel 160, and an L mode display panel 165. In one embodiment, the interface also includes multiple toolbars B1, B2, and B3. In panel 150, three markers are shown as crosses superimposed over the angiography image. The top marker corresponds to a proximal reference frame shown in panel 160. The middle marker corresponds to a minimum lumen area frame shown in panel 160 or an active OCT frame shown in panel 155. The bottom marker corresponds to a distal reference frame shown in panel 160.

FIG. 7A shows a minimum lumen area plot as part of the lumen profile for the blood vessel imaged during a pull back of the OCT probe in panel 160. The D and P arrows show proximal and distal directions along the imaged blood vessel. The cut plane shown as a line having sections L1 and L2 is shown in the cross-sectional view of panel 155 and also shown by sections L1 and L2 in the L-mode panel 165. An information bar B1, a measurement bar B2, and a menu bar B3 are shown.

As shown, the distance of a blood vessel such as an artery can be measured relative to two endpoints as shown by the exemplary measurement distances of 119.88 mm. In addition, the mean diameter can be shown at each end of the selected reference frames for measuring the vessel such as by the mean diameter values of 39.2 mm and 44.2 mm at the distal and proximal reference frames respectively. As shown, the MLA is about 22 mm². At the MLA frame, the vessel mean diameter is about 2.11 mm and the percent diameter stenosis is 25.4% relative to the average diameters of the proximal and distal reference frames.

software such as depicted on a graphic user interface are shown on the right side. In addition, the outline of the various motions or button actuations and the resultant function or outcome that result in software can also be grouped on a per diagnostic technology basis as outlined below with respect optical coherence tomography and FFR. These exemplary motions and interface event/action mappings and can be modified, swapped or otherwise programmed in a different manner for a given embodiment. The button 55 is also included with respect to the motion and GUI event/action mappings listed below.

Pointing Device Motion/Actuation and Associated Function or Outcome (OCT)

| Pointing Device Motion | Software/Graphic User Interface Outcome |
|---|---|
| Move left/right | Move pointer on screen left/right |
| Move up/down | Move pointer on screen up/down |
| Clockwise (CW) rotation | Increment active frame proximal/distal on one or more active displays |
| Counter Clockwise (CCW) rotation | Decrement active frame proximal/distal on one or more active displays |
| Press and release 55 | Left mouse click |
| Press and hold 55 | Engage rotation mode to spin the cut plane used to generate the L-mode and 3D views |
| Press and hold 55 + rotate CW/CCW | Rotate cut plane CW/CCW on one or more active displays |

Figure 8B:
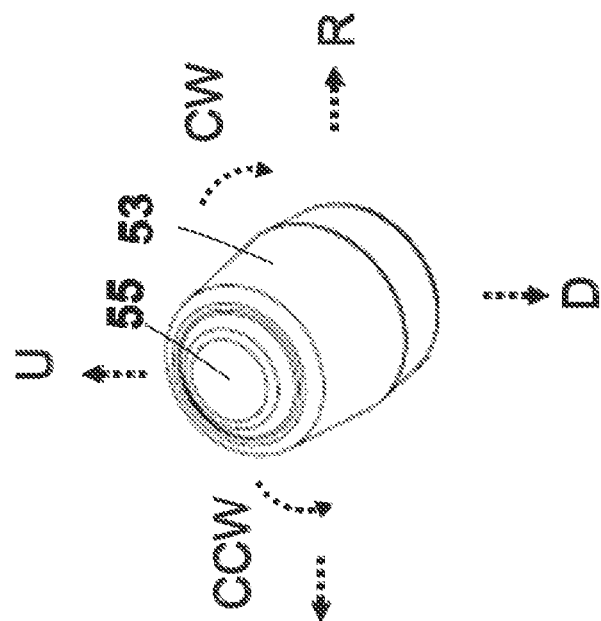
FIGS. 8A and 8B are schematic diagrams showing various rotational directions and input device positions in accordance with an illustrative embodiment of the invention.
Figure 8A:
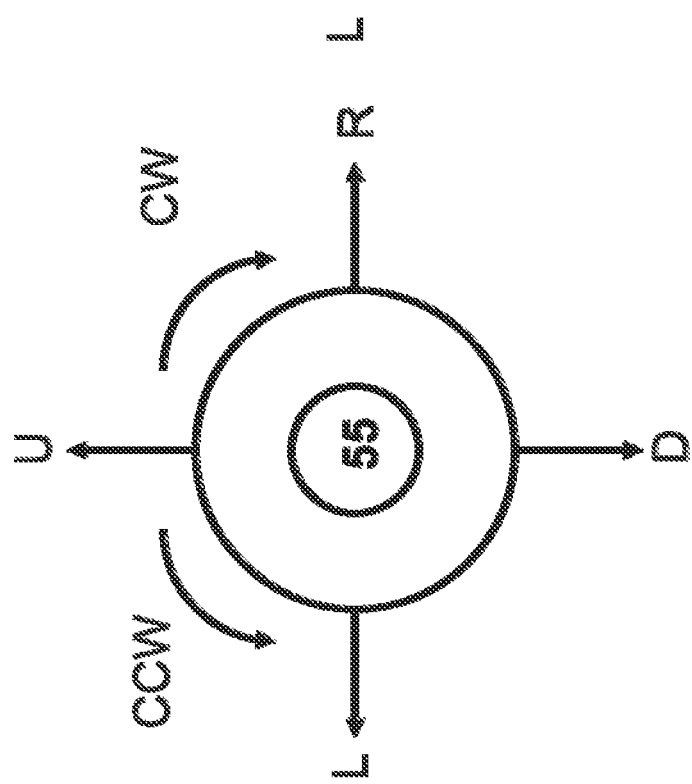

FIG. 7C shows a keypad that includes a plurality of buttons such as the buttons A1-A6 shown in FIG. 1B. FIGS. 8A and 8B shows a representation of the rotatable elongate member or joystick embodiment of a controller embodiment of the invention. With respect to the buttons shown in FIG. 7C, the corresponding event or actions that occur in the graphic user interface of FIGS. 7A and 7B in response to actuating the button are specified below. These are exemplary button actuation and interface event/action mappings and can be modified, swapped or otherwise programmed in a different manner for a given embodiment.

| Button | Affected Panel/Menu | Function/Graphic User Interface Outcome |
|---|---|---|
| A1 | 150 | Toggle display between (Off, 3D, Flythrough, Angiography Coregistration) |
| A2 | None | Print to USB |
| A5 | 160 | Snap distal reference frame to current active frame |
| A6 | 160 | Snap proximal reference frame to current active frame |
| A4 | 150, 155, 160, 165 | Toggle stent segmentation between (Off, Lumen, Stent, Lumen and Stent) |
| A3 | 160 | Toggle display between (Off, Lumen Profile) |

Flythrough refers to a visualization mode where the user can fly through a 3D rendering of the vessel as if from the inside. Segmentation refers to display of specific vessel features (such as the vessel lumen, stent struts, certain tissue constituents, etc) in isolation from other vessel features.

With respect to the elongate member/joystick clockwise and counter clockwise rotations or twists shown in FIGS. 8A and 8B, the corresponding event or actions that occur in the graphic user interface of FIGS. 7A and 7B or other graphic user interface embodiments in response to rotation or twist are specified below. Specifically, tables showing various motions or other actions performed using the joystick on the left side and the associated outcome or function achieved in Pointing Device Motion/Actuation and Associated Function or Outcome (FFR)

| Pointing Device Motion | Software/Graphic User Interface Outcome |
|---|---|
| Move left/right | Move pointer on screen left/right |
| Move up/down | Move pointer on screen up/down |
| Clockwise (CW) rotation | Increment pressure waveform forward on one or more active displays |
| Counter Clockwise (CCW) rotation | Increment pressure waveform backward on one or more active displays |
| Press and release 55 | Left mouse click/click-to-zoom |
| Press and hold 55 | None/User Defined |
| Press and hold 55 + rotate CW/CCW | None/User Defined |

Figure 9:
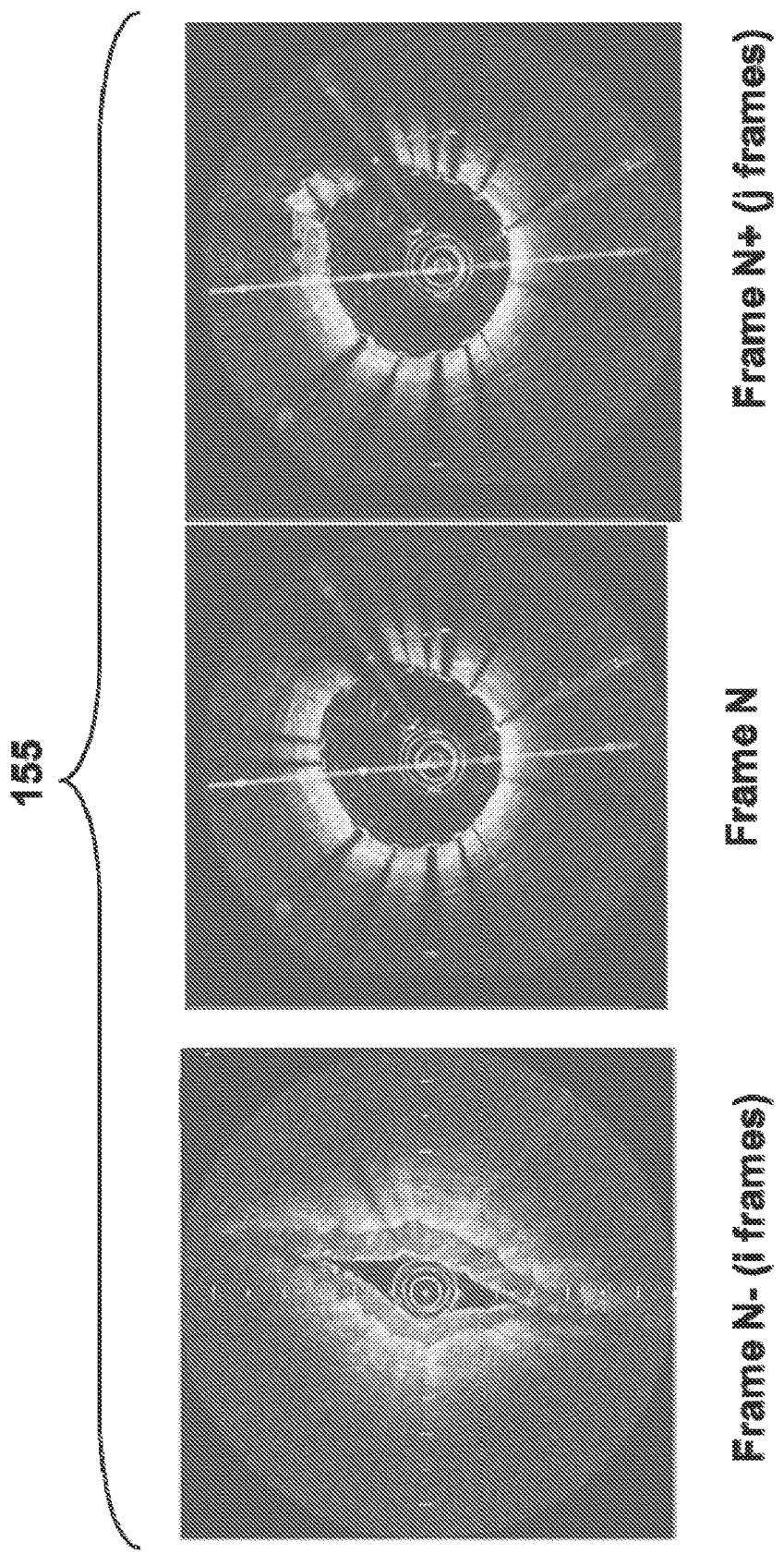
FIG. 9 is a series of cross-sectional images of a blood vessel corresponding to three frames of image data that can be incremented and decremented through by twisting an input device in accordance with an illustrative embodiment of the invention.

FIG. 9 shows an initial frame N in the middle corresponding to a cross-section of the lumen at a particular position. By turning the rotatable elongate member such as a joystick in a given embodiment, the user interface will move to the next frame based on the direction of rotation. In this way, a user can turn the rotatable member and increment on a frame or group of frames basis in one direction and then turn back in the opposite direction and decrement through the frames back to or past the starting frame. The image to the left of initial frame N shows a decrement of i frames. The image to the right of initial frame N shows an increment of j frames.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

The present invention may be embodied in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In one embodiment of the present invention, some or all of the processing of the data used to generate a control signal or initiate a user interface command is implemented as a set of computer program instructions that is converted into a computer executable form, stored as such in a computer readable medium, and executed by a microprocessor under the control of an operating system. In one embodiment, output control signals from a controller are transformed into processor understandable instructions suitable for responding to joystick positions, controlling a graphical user interface, control and graphic signal processing, displaying cross-sectional information and images from other data collection modalities, displaying OCT, angiography, and other data as part of a graphic user interface and other features and embodiments as described above.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed over a network.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Various examples of suitable processing modules are discussed below in more detail. As used herein a module refers to software, hardware, or firmware suitable for performing a specific data processing or data transmission task. Typically, in a preferred embodiment a module refers to a software routine, program, or other memory resident application suitable for receiving, transforming, routing and processing instructions, or various types of data such as OCT scan data, user interface data, control signals, angiography data, user actions, frequencies, interferometer signal data, and other information of interest.

Computers and computer systems described herein may include an operatively associated machine-readable medium such as computer-readable media such as memory for storing software applications used in obtaining, processing, storing and/or communicating data. It can be appreciated that such memory can be internal, external, remote or local with respect to its operatively associated computer or computer system.

The term "machine-readable medium" includes any medium that is capable of storing, encoding or carrying a set of instructions for execution by the machine and that cause the machine to perform any one or more of the methodologies of the present disclosure. While the machine-readable medium is shown in an example embodiment to be a single medium, the term "machine-readable medium" should be taken to include a single medium or multiple media (e.g., a database, one or more centralized or distributed databases and/or associated caches and servers) that store the one or more sets of instructions.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A data collection system controller comprising:
   a housing comprising
      a user facing section, and
      a patient support facing section;
   a first input device extending through a hole defined by the housing; and
   an attachment device comprising a clamping mechanism, the attachment device attached to the housing and configured to slidably engage and clamp a portion of a patient support.

2. The data collection system controller in claim 1, wherein the clamping mechanism compromises a rigid C-shaped region defining a groove, wherein the groove slidably engage the portion of the patient support.

3. The data collection system controller in claim 2, wherein the portion of the patient support is a rail.

4. The data collection system controller in claim 2 wherein the clamping mechanism further comprises a slidable member configured to slide in front of the portion of the patient support and align with the rigid C-shaped region such that the portion of the patient support is secured in the groove and behind the slidable member.

5. The data collection system controller in claim 1, wherein the first input device comprises a joystick comprising a rotatable knob.

6. The data collection system controller in claim 5, wherein the input device is a controller for an intravascular imaging system.

7. The data collection system controller in claim 1, wherein the attachment device locks to the portion of the patient support by pressing on an upper ridged member, wherein the upper ridged members attached to the slidable member at a pivot point.

8. The data collection system controller in claim 1, wherein one of the user facing section and the patient support facing section has a forward tilt bias.

9. The data collection system controller in claim 1, wherein the housing comprises a bend such that the user facing section and the patient support facing section are oriented on either side of the bend.

10. The data collection system controller in claim 1, wherein the user facing section is oriented to face away from the patient support.

11. The data collection system controller in claim 1, wherein the support facing section defines a hole and further comprising
   a second input device comprising
      a knob comprising a third input device, and
      a rotatable shaft extending through the hole and partially disposed within the knob.

12. A data collection system controller comprising:
   an attachment device of the data collection system controller comprising
      a linkage defining a first bore and a second bore;
      a C-shaped base comprising
         a top portion defining a top groove to interface with a top surface of a support;
         a bottom portion defining a bottom groove to interface with a bottom surface of the support; and
      slidable member, wherein the slidable member pivots relative to the first bore, wherein the second bore is attached to and pivots relative to the top portion, wherein the slidable member is disposed in front of the top groove and secure a portion of the patient support disposed in the groove.

13. The attachment device of claim 12, wherein the attachment device has an open position and closed position such that the top portion and the bottom portion are secured to the support when the attachment device is in a closed position.

14. The attachment device of claim 12, wherein the slidable member comprises a lip sized to extend over the portion of the patient support.

15. The attachment device of claim 12, wherein the attachment device has a open position and closed position such that distance between the top portion and the bottom portion is greater when the attachment portion is in the open position than when the attachment device is in a closed position.

16. The attachment device of claim 12 further comprising a lever member, the lever member pivotally attached to the base, wherein the lever member has a top surface comprising a plurality of ridges.

17. The attachment device of claim 12 further comprising
   a housing comprising
      a user facing section, and
      a patient support facing section; and
   a first input device extending through a hole defined by the housing, wherein the attachment device is attached to the housing.

18. The attachment device of claim 17, wherein the C-shape base and the slidable member clamp the patient support portion by pivoting and sliding of slidable member.

* * * * *